US008574454B2

(12) United States Patent
Bachels et al.

(10) Patent No.: US 8,574,454 B2
(45) Date of Patent: Nov. 5, 2013

(54) PATTERNABLE LIQUID CRYSTAL POLYMER COMPRISING THIO-ETHER UNITS

(75) Inventors: Thomas Bachels, Menzingen (CH); Izabela Bury, Basel (CH); Guy Marck, Schlierbach (CH); Hubert Seiberle, Weil am Rhein (DE); Peggy Studer, Huningue (FR); Stefano Tugulu, Allschwil (CH)

(73) Assignee: Rolic AG, Zug (CH)

( * ) Notice: Subject to any disclaimer, the term of this patent is extended or adjusted under 35 U.S.C. 154(b) by 490 days.

(21) Appl. No.: 12/515,918

(22) PCT Filed: Dec. 11, 2007

(86) PCT No.: PCT/CH2007/000622
§ 371 (c)(1),
(2), (4) Date: May 21, 2009

(87) PCT Pub. No.: WO2008/077261
PCT Pub. Date: Jul. 3, 2008

(65) Prior Publication Data
US 2010/0059709 A1 Mar. 11, 2010

(30) Foreign Application Priority Data

Dec. 22, 2006 (EP) .................... 06127143
Dec. 22, 2006 (EP) .................... 06127151

(51) Int. Cl.
*C09K 19/52* (2006.01)
*C09K 19/06* (2006.01)
*C09K 19/00* (2006.01)
*G02F 1/1333* (2006.01)
*C08G 75/04* (2006.01)

(52) U.S. Cl.
USPC ............ 252/299.01; 252/299.6; 428/1.1; 349/86; 349/88; 528/374; 528/376

(58) Field of Classification Search
USPC ........ 252/299.01, 299.6; 428/1.1; 349/86, 88; 528/374, 376
See application file for complete search history.

(56) References Cited

U.S. PATENT DOCUMENTS

| 4,122,027 A | 10/1978 | Cole, Jr. et al. |
| 4,401,369 A | 8/1983 | Jones |
| 4,565,424 A | 1/1986 | Huffman et al. |
| 4,667,020 A | 5/1987 | Etzbach et al. |
| 4,983,479 A | 1/1991 | Broer et al. |
| 5,093,027 A | 3/1992 | Kelly et al. |
| 5,230,828 A | 7/1993 | Kelly |
| 5,250,222 A | 10/1993 | Kelly et al. |
| 5,356,559 A | 10/1994 | Kelly |
| 5,360,577 A | 11/1994 | Buchecker et al. |
| 5,389,285 A | 2/1995 | Shannon et al. |
| 5,411,676 A | 5/1995 | Kelly et al. |
| 5,567,349 A | 10/1996 | Kelly et al. |
| 5,637,255 A | 6/1997 | Kelly et al. |
| 5,650,534 A | 7/1997 | Kelly et al. |
| 5,700,393 A | 12/1997 | Kelly |
| 5,744,514 A | 4/1998 | Shustack |
| 5,851,424 A | 12/1998 | Kelly |
| 5,871,665 A | 2/1999 | Coates et al. |
| 6,117,920 A | 9/2000 | Jolliffe et al. |
| 6,218,578 B1 | 4/2001 | Coates et al. |
| 6,319,963 B1 | 11/2001 | Coates et al. |
| 6,395,351 B1 | 5/2002 | Benecke et al. |

(Continued)

FOREIGN PATENT DOCUMENTS

| DE | 44 40 010 A1 | 5/1996 |
| EP | 0 331 233 A2 | 9/1989 |

(Continued)

OTHER PUBLICATIONS

"Liquid-Crystalline Polymers Prepared by Polyaddition of Dithiols to Mesogenic Bisacrylates or Bismethacrylates", Journal of Polymer Science, Polymer Chemistry Edition, 1990, pp. 1983-1988, vol. 28, No. 7.

(Continued)

*Primary Examiner* — Geraldina Visconti
(74) *Attorney, Agent, or Firm* — Sughrue Mion, PLLC

(57) ABSTRACT

The present invention relates to a photo-polymerized, patterned or unpatterned liquid crystal polymer, especially a liquid crystal polymer film or a liquid crystal polymer network, comprising thio-ether units of formula (I)

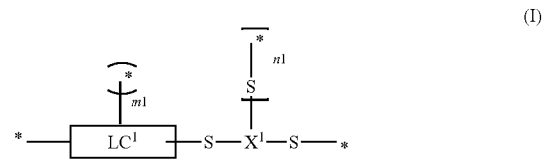

Figure 1:
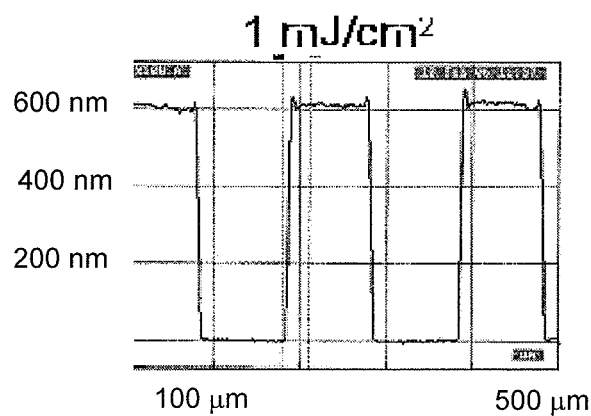

\* covalent bond, which links the unit of formula (I) to the residue of the polymer
wherein
$LC^1$ is selected from the group of liquid crystal residues,
$X^1$ is selected from the group of aliphatic organic residues, and
$n^1$ is an integer $\geq 0$ and
$m^1$ is an integer $\geq 0$;
with the proviso that if $n^1$ is 0, then $m^1$ is >0, and if $m^1$ is 0, then $n^1$ >0;
which is prepared in an atmosphere containing oxygen, preferably with an amount of $0.1 \leq \text{oxygen} \leq 50\%$, more preferably $1 \leq \text{oxygen} \leq 25\%$, most preferably in air;
with the proviso that polymer dispersed liquid crystals are excluded.
Further, this invention relates to a composition used for the preparation of that photo-polymerized liquid crystal polymer of the invention, to processes of the preparation of that liquid crystal polymer and to its use.

18 Claims, 3 Drawing Sheets

(56) References Cited

U.S. PATENT DOCUMENTS

| | | |
|---|---|---|
| 6,630,076 B1 | 10/2003 | Cherkaoui et al. |
| 6,733,690 B1 | 5/2004 | Lukac et al. |
| 6,746,729 B1 | 6/2004 | Cherkaoui et al. |
| 2004/0061105 A1 | 4/2004 | St. Lawrence et al. |
| 2004/0140451 A1 | 7/2004 | Meyer et al. |
| 2004/0164272 A1 | 8/2004 | Buchecker et al. |
| 2010/0059709 A1* | 3/2010 | Bachels et al. ............ 252/299.6 |

FOREIGN PATENT DOCUMENTS

| | | |
|---|---|---|
| EP | 0 611 786 A1 | 8/1994 |
| EP | 0 618 237 A1 | 10/1994 |
| EP | 0 763 552 A2 | 3/1997 |
| EP | 1 090 325 B1 | 9/2002 |
| EP | 1 669 431 A1 | 6/2006 |
| GB | 2 348 207 A | 9/2000 |
| GB | 2 394 718 A | 5/2004 |
| WO | 88/02902 A1 | 4/1988 |
| WO | 95/24454 A1 | 9/1995 |
| WO | 96/10049 A1 | 4/1996 |
| WO | 96/25470 A1 | 8/1996 |
| WO | 98/00428 A1 | 1/1998 |
| WO | 99/37735 A1 | 7/1999 |
| WO | 00/04110 A1 | 1/2000 |
| WO | 00/05189 A1 | 2/2000 |
| WO | 00/07975 A1 | 2/2000 |
| WO | 00/48985 A1 | 8/2000 |
| WO | 00/55110 A1 | 9/2000 |
| WO | 00/63154 A1 | 10/2000 |
| WO | 01/27040 A1 | 4/2001 |
| WO | 02/06195 A1 | 1/2002 |
| WO | 02/06196 A1 | 1/2002 |
| WO | 02/06265 A1 | 1/2002 |
| WO | 02/34739 A1 | 5/2002 |
| WO | 02/094805 A1 | 11/2002 |
| WO | 03/027056 A1 | 4/2003 |
| WO | 03/054111 A1 | 7/2003 |
| WO | 2004/085547 A1 | 10/2004 |
| WO | 2005/054406 A1 | 6/2005 |
| WO | 2005/105932 A1 | 11/2005 |

OTHER PUBLICATIONS

Eiichi Kobayashi et al., "Synthesis and Properties of the Addition Polymer of Benzenedithiol with Divinylbenzene", Polymers for Advanced Technologies, Jun. 1, 1995, pp. 394-401, vol. 6, No. 6.

Eiichi Kobayashi et al., "Phase Transition of Layer Structure of Poly(p-benzenedithiol-co-p-diethynyl-benzene) by Heat or Photon Mode", Polymers for Advanced Technologies, Apr. 1, 1992, pp. 81-85, vol. 3, No. 2.

Johan Lub et al., "The Synthesis and Polymerisation of a Liquid Crystalline Crosslinkable Thiol-Ene Molecule", Molecular Crystel Liquid Crystel, 1999, pp. 259-266, vol. 332.

Hans T. A. Wilderbeek et al., "Photo-Initiated Polymerization of Liquid Crystalline Thiol-Ene Monomers in Isotropic and Anisotropic Solvents", J. Phys. Chem., 2002, pp. 12874-12883, vol. 106, No. 50.

Neil B. Cramer et al., "Photopolymerizations of Thiol-Ene Polymers without Photoinitiators", Macromolecules, 2002, pp. 5361-5365, vol. 35, No. 14.

* cited by examiner

PATTERNABLE LIQUID CRYSTAL POLYMER COMPRISING THIO-ETHER UNITS

The present invention relates to a photo-polymerized, patterned or unpatterned liquid crystal polymer, especially a liquid crystal polymer film or a liquid crystal polymer network, comprising thio-ether units of formula (I)

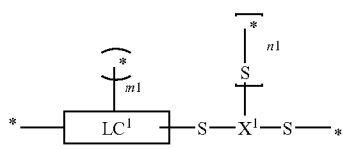

(I)

* covalent bond, which links the unit of formula (I) to the residue of the polymer wherein $LC^1$ is selected from the group of liquid crystal residues, $X^1$ is selected from the group of aliphatic organic residues, and $n^1$ is an integer 0 and $m^1$ is an integer with the proviso that if $n^1$ is 0, then $m^1$ is >0, and if $m^1$ is 0, then $n^1$>0; and which is prepared in an atmosphere containing oxygen, preferably with an amount of 0.1≤oxygen≤50%, more preferably 1≤oxygen≤25%, most preferably in air;

with the proviso that polymer dispersed liquid crystals are excluded.

Further the present invention relates to a process for the preparation of patterned and unpatterned liquid crystal polymer, liquid crystal polymer film or liquid crystal polymer network and its use for optical or electro-optical components.

Broer et at describe in Molecular Crystal Liquid Crystal (1999), 332, 259, the synthesis of a thiol-ene functionalized liquid crystal of the below given formula

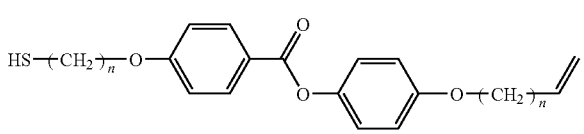

A drawback of this material is that the initial alignment of this thiol-ene functionalized liquid crystal is partly lost during photopolymerization resulting in opaque polymeric liquid crystal polymer films. Polymerization shrinkage, phase separation and crystallization are the main causes of the disturbance of the macro alignment. To overcome these problems, a crosslinkable multi-functionalized thiol-ene liquid crystal (see below) was designed:

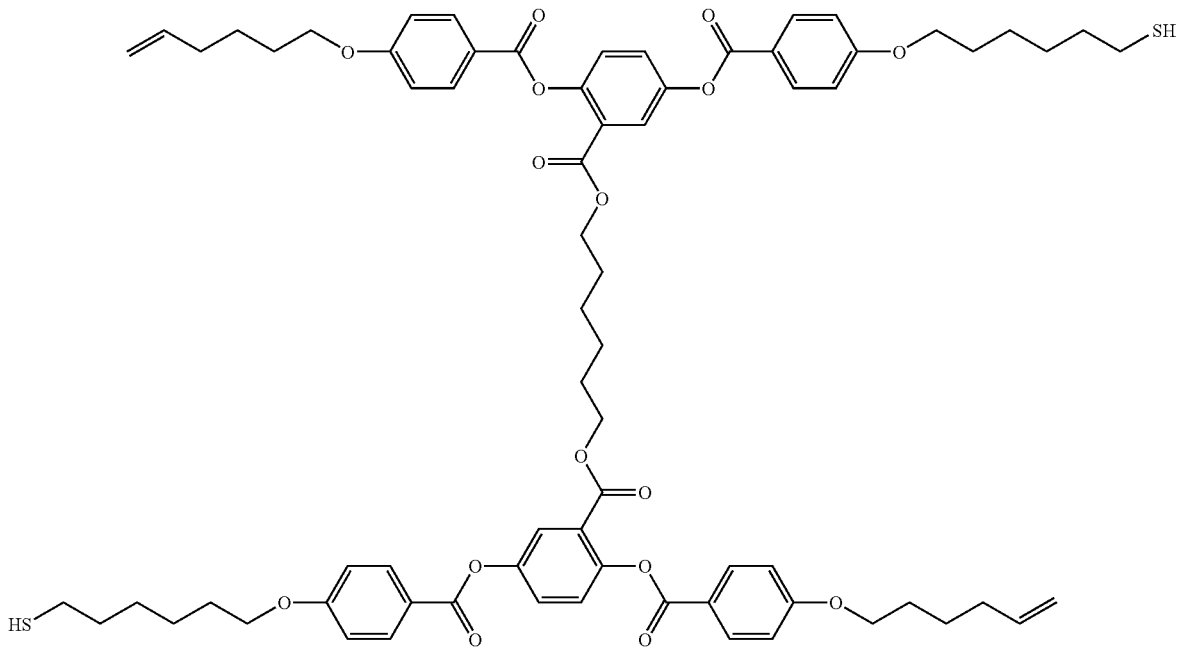 [SMILES: C=CCCCCOc1ccc(C(=O)Oc2ccc(OC(=O)c3ccc(OCCCCCCS)cc3)cc2C(=O)OCCCCCCOC(=O)c2cc(OC(=O)c3ccc(OCCCCCCS)cc3)ccc2OC(=O)c2ccc(OCCCCC=C)cc2)cc1]

However, liquid crystals have low solubility properties as Wilderbeek (J. Phys. Chem. B (2002), 106, 12874) pointed out. Low solubility can give reason to severe problems in the manufacturing processes of liquid crystal films, for e.g. their applicability in coating processes on the substrate. Furthermore, there is no easy access to this multifunctional liquid crystal. The process of their preparation comprises several process steps and in the end a wasteful purification. In addition, there remains no flexibility in fine-tuning the thiol/ene ratio with such a functionalized LCP compound.

GB 2 394 718-A describes the accessibility of a polymerized liquid crystal film with retardation pattern, by controlling the polymerization conditions, such as the intensity of radiation, atmosphere and temperature and/or using a suitable polymerizable liquid crystal formulation. There is still a demand for simpler processes giving access for patterning of optical properties to two or more different retardation values. This easy accessibility is very useful for various applications.

The invention relates to a liquid crystal polymer, comprising thio-ether units of formula (I) as given above.

Preferably, the present invention relates to the liquid crystal polymer given above, which is prepared without using a cationic photoinitiator.

Further preferred is the liquid crystal polymer given above, which is prepared without applying oxygen barrier layers excluding oxygen.

Additionally preferred, the present invention relates to the liquid crystal polymer given above, which is prepared using low UV lamp power and energy.

The wording "atmosphere containing oxygen" excludes an atmosphere of inert gas.

Preferably, the present invention relates to a liquid crystal polymer within the above preferences and limitations, comprising thio-ether units of formula (Ia)

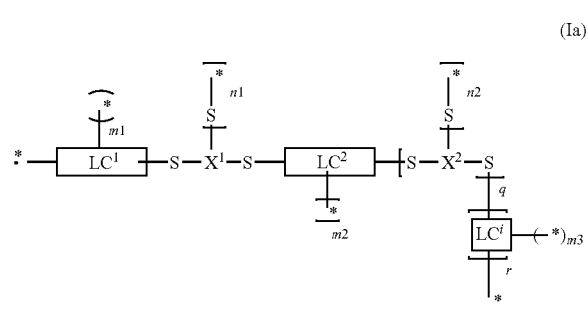

(Ia)

\* covalent bond, which links the unit of formula (Ia) to the residue of the polymer
wherein
$LC^1$, $LC^2$ and $LC^i$ are independently from each other a residue of a liquid crystal,
wherein
$LC^i$ is selected from the group of $LC^3$, $LC^4$, $LC^5$, $LC^6$, $LC^7$ and Le, which independently from each other denote a residue of a liquid crystal,
$X^1$ and $X^2$ are independently from each other an aliphatic organic residue, which is preferably free from reactive carbon-carbon unsaturations
$n^1$ and $n^2$ are integers $\geq 0$, preferably integers from 1 to 10,
r is an integer from $\geq 0$, preferably integers from 0 to 1000,
$m^1$, $m^2$ and $m^3$ are independently from each other integers $\geq 0$, preferably integers from 0 to 10,
q is 0 or 1;
with the provisos that if q is 0, then $LC^2$ and $LC^i$ are directly linked to each other; and
that if $n^1$ and $n^2$ are 0, then at least one $m^1$, $m^2$ or $m^3$ is >0, and if $m^1$, $m^2$ and $m^3$ are 0, then at least one $n^1$ and $n^2$ is >0.

More preferably, the present invention relates to a liquid crystal polymer within the above preferences and limitations comprising thio-ether units of formula (Ib)

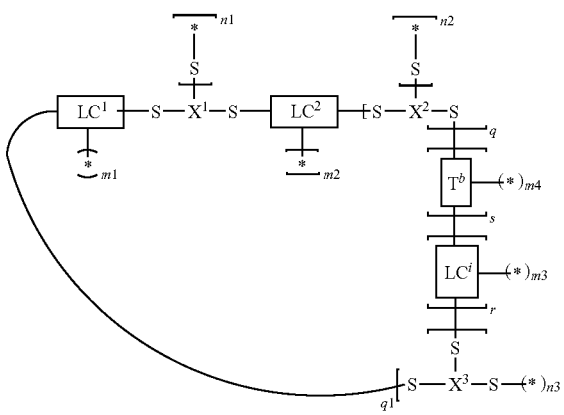

(Ib)

\* covalent bond, which links the unit of formula (Ib) to the residue of the polymer
wherein
$LC^1$, $LC^2$ and $LC^i$ are independently from each other a residue of a liquid crystal,
wherein
$LC^i$ is selected from the group of $LC^3$, $LC^4$, $LC^5$, $LC^6$, $LC^7$ and Le, which are independently from each other denote a residue of a liquid crystal,
$T^b$ is selected from the group of $T^1$, $T^2$, $T^3$, $T^4$, $T^5$ and $T^6$, which are independently from each other and which denote a residue of a reactive additive,
$X^1$, $X^2$ and $X^3$ are selected independently from each other from the group of aliphatic organic residues, preferably bi- or polyvalent organic residues, which are preferably free from reactive carbon-carbon unsaturations,
$n^1$, $n^2$ and $n^3$ are independently from each other integers $\geq 0$, preferably integers from 1 to 10,
$m^1$, $m^2$, $m^3$ and $m^4$ are independently from each other integers $\geq 0$, preferably integers from 0 to 10, more preferably an integer from 0 to 2,
q and q1 are independently from each other 0 or 1, and
r and s are independently from each other an integer from 0 to 1000, preferably from 0 to 500, more preferably from 0 to 100; most preferably "s" is an integer from 0 to 10 and especially most preferably "s" is an integer from 0 to 5; and "r" ranges from 0 to 10;
with the proviso that if q is 0, then $LC^2$ and $LC^i$ are directly linked to each other; and if $n^1$, $n^2$ and $n^3$ are 0, then at least one $m^1$, $m^2$, $m^3$ and $m^4$>0, and if $m^1$, $m^2$, $m^3$ and $m^4$ are 0 than at least one $n^1$, $n^2$ and $n^3$>0.

The value of suffixes r and s depends on the material and in particular on the composition of the formation used for the preparation of the liquid crystal film and the process conditions of the preparation of the liquid crystal polymer.

Preferred is a liquid crystal polymer of formula (Ib), wherein:
r and s are independently from each other an integer from 0 to 500, more preferably from 0 to 100; most preferably "s" ranges from 0 to 10 and especially most preferably s denotes from 0 to 5 and "r" ranges from 0 to 10; and/or
$n^1$, $n^2$ and $n^3$ are independently from each other an integer from 0 to 4, more preferred 0, 1 to 2 and most preferred 1 or 2.

Liquid crystal polymer is preferably a liquid crystalline (co)polymer, elastomer, polymer gel, film or polymer network, and more preferably a liquid crystal polymer network or film.

The term "photo-polymerized" is described below in the process of the present invention.

The terms "residue of a liquid crystal", "residue of a reactive additive" and "compound residue" represent the polymerized form of a liquid crystal respective a reactive additive respective a compound in the liquid crystal polymer.

In a further more preferred embodiment the present invention relates to a liquid crystal polymer of formulae (I), (Ia) or (Ib), wherein the thio-ether linkage "—S—" to the liquid crystals $LC^1$, $LC^2$ and/or $LC^i$ comprises a linking unit, which are selected from a compound residue of the group of compounds given in the following:

norbornene, vinyl ether, vinyl ester, allyl ether, allyl ester, propenyl ether, allyl triazine, allyl isocyanurate, alkene, acrylate, unsaturated ester, imide, maleimide, methacrylate, acrylonitrile, styrene, diene, vinyl amide and alkyne, and most preferably from the group given below:
alkyne, alkene, vinyl ether, vinyl ester, allyl ether, allyl ester, acrylate and methacrylate,
and especially most preferably from the group of
acrylate and methacrylate.

The residue of a liquid crystal and the residue of a reactive additive, have in their un-polymerized form at least two polymerizable functional groups, especially two unsaturated carbon-carbon bonds. The unsaturated carbon-carbon bonds preferably comprise double and/or triple bonds, and more preferably double bonds.

Preferably, the polymerizable functional group of the liquid crystal comprises an unsaturated carbon-carbon bond, which is preferably selected from the group of compounds comprising norbornene, alkyne, vinyl ether, vinyl ester, allyl ether, allyl ester, propenyl ether, allyl triazine, ally isocyanurate, alkene, acrylate, unsaturated ester, imide, maleimide, methacrylate, acrylonitrile, styrene, diene and vinyl amide; and more preferably, the polymerizable functional group having an unsaturated carbon-carbon bond are selected from the group of compounds comprising alkyne, alkene, vinyl ether, vinyl ester, allyl ether, allyl ester, acrylate and methacrylate; and most preferably acrylate and methacrylate.

The term liquid crystal as used in the context of the present invention denotes materials or compounds with the ability to induce liquid crystal phase behavior, for example comprising one or more rod-shaped, board-shaped or disk-shaped mesogenic groups. Liquid crystal compounds with rod-shaped or board-shaped groups are also known in the art as calamitic liquid crystals. Liquid crystal compounds with a disk-shaped group are also known in the art as discotic liquid crystals. The compounds or materials comprising mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

Examples of suitable polymerizable liquid crystals that can be used in the present invention are for example disclosed in WO 2005/105932, WO 2005/054406, WO 2004/085547, WO 2003/027056, U.S. Pat. Nos. 2004/0164272, 6,746,729, 6,733,690, WO 2000/48985, WO 2000/07975, WO 2000/04110, WO, 2000/05189, WO 99/37735, U.S. Pat. Nos. 6,395,351, 5,700,393, 5,851,424 and U.S. Pat. No. 5,650,534.

The term "aliphatic organic residue" as used in the context of the present invention relates to the organic residues of polythiols, within the meaning and preferences as given below.

In the context of the present invention the term "aliphatic" includes straight-chain and branched hydrogencarbons with, as well as saturated and unsaturated groups, wherein at least one carbon, hydrogen and/or hydrogencarbon may be replaced by an hetereoatom, such as for example N, S, O, OOC, COO, OCO, OCOO, OOCO, CO, etc. Possible substituents include alkyl, aryl cycloalkyl, as well as amino, cyano, epoxy, halogen, hydroxy, nitro, oxo etc. Possible heteroatoms, which may replace carbon atoms include nitrogen, oxygen and sulphur. In the case of nitrogen further substitution is possible with groups such as alkyl, aryl and cycloalkyl. Likewise, the terms "alkyl" and "alkylene", as used herein, includes straight-chain or branched groups, as well as saturated and unsaturated groups.

In the context of the present invention, suitable polythiols may be any of those known in the art. As polythiol, any compound can be used which comprises molecules having two or more thiol groups per molecule. The polythiol has a molecular weight in the range from about 50 to about 20,000.

Preferably polythiols are monomeric aliphatic polythiols, oligomeric and polymeric polythiols.

Preferred polythiols relates to di-, tri-, tetra- or multifunctional thiols.

Preferred polymeric polythiol is for example polypropylene ether glycol bis(beta-mercaptopropionate) which is prepared from polypropylene-ether glycol (e.g. Pluracol P201, Wyandotte Chemical Corp.) and beta-mercaptopropionic acid by esterification. Poly-alpha-mercaptoacetate or poly-beta-mercaptopropionate esters, particularly the trimethylopropane triesters or pentaerythritol tetra esters are preferred.

Preferred alkyl thiol functional compounds are for example 1,2-dimercaptoethane, 1,6-dimercaptohexane, decamethylene dithiol, and the like. Thiol terminated polysulfide resins may also be employed.

Preferred aliphatic dithiols include 1,2-ethanedithiol, butanedithiol, 1,3-propanedithiol, 1,5-pentanedithiol, 2,3-dimercapto-1-propanol, dithioerythritol, 3,6-dioxa-1,8-octanedithiol, 1,8-octanedithiol hexanedithiol, dithiodiglycol, pentanedithiol, decanedithiol, 2-methyl 1,4 butanedithiol, bis-mercaptoethylphenyl methane, 1,9-nonanedithiol(1,9-dimercaptononane), glycol dimercaptoacetate.

Preferred oligomeric dithiols include difunctional mercapto functional urethane oligomers derived from end capping moieties of hydroxyethyl mercaptan, hydroxypropyl mercaptan, dimercaptopropane, dimercapto ethane as described in patent by Shustack U.S. Pat. No. 5,744,514. Preferred trithiol functional compounds include, trimethylolethane tris-mercaptopropionate, trimethylolpropane tris-mercaptopropionate (TMPTSH), trimethylolethane tris-mercaptoacetate, and trimethylolpropane tris-mercaptoaacetate glycerol tri(11-mercaptoundecanoate), trimethylol propane tri(11-mercaptoundecate).

Preferred tetrafunctional thiols include pentaerythritol tetramercapto propionate, pentaerythritol tetramercapto acetate, and pentaeyrthritotetra(11-mercaptoundecate)

Preferred multifunctional thiols having functionality greater than 4, include polythiols as described on page 7 of Loctite patent of (WO/88 02902).

Multi functional thiols can be obtained by reacting thioalkyl carboxylic acids eg thioglycolic acid, mercapto propionic acid with high functional alcohols, amines and thiols. Furthermore, multifunctional thiols can be obtained by reacting mercapto alkyl trialkoxy silanes with silanols that may be polymeric or silica based silanols. Other preferred multifunctional thiols are obtained using thiol carboxylic acids (HS—R—COOH) where R=alkyl, or aryl groups eg thioundecanoic acid of which the COOH groups are reacted with reactive enes, alcohols, thiols or amines that are multifunctional.

Preferably, polythiols having an organic residue of —$C_1$-$C_{10}$alkylen-COOH with polyhydroxy compounds, such as for example glycols, triols, tetraols, pentaols or hexaols.

More preferred, an organic residue is an ester of glycolic acid (—$CH_2$COOH), alpha-propionic acid (—CH($CH_3$)—COOH and beta-propionic acid (—$CH_2CH_2$COOH) with polyhydroxy compounds such as for example glycols, triols, tetraols, pentaols or hexaols.

Preferred are organic residues of an organic ester of —$C_1$-$C_{10}$alkylen-COOH, preferably —$C_1$-$C_4$alkylen-COOH, most preferably —$C_2$-$C_3$alkylen-COOH with polyhydroxy compounds, such as for example glycols, triols, tetraols, pentaols or hexaols. More preferred are organic residues of an ester of —$CH_2$COOH, —CH($CH_3$)—COOH, —$CH_2CH_2$COOH with polyhydroxy compounds such as for example glycols, triols, tetraols, pentaols or hexaols.

Especially most preferred are organic residues from polythiols such as glycolate and propionate esters such as ethylene glycol bis(thioglycolate), ethylene glycol bis(beta-mercaptopropionate), trimethylolpropane tris(thioglycolate), trimethylolpropane tris(beta-mercaptopropionate), pentaerythritol tetrakis(beta-mercaptopropionate), glycol dimercaptoacetate, 1,2,6-hexanetriol trithioglycolate, trimethylolethane trithioglycolate, pentaerythritol tetra(mercaptoacetate), trimethylolpropane trithioglycolate and glycetryl thiioglycolate; and propionate esters such as trimethylolethane tri-(3-mercapto propanate), pentaerythritol tetrakis(3-mercaptopropionate), trimethylolpropane tri(3-mercapto propionate) or glycol dimercaptopropionate, all of which are commercially available, or are accessible by methods known in the art.

The term "reactive additive" as used in the context of the present invention denotes a polymerizable reactive additive, with at least a single polymerizable group.

For example, a reactive additive is a cross-linker, a reactive diluent, a mono-reactive liquid crystal, a monofunctional thiol, such as for example dodecane thiol.

Further, reactive additives are for example selected from the below listed group of additives, which carry at least one polymerizable group: antioxidants, accelerators, dyes, inhibitors, activators, fillers, chain transfer inhibitor, pigments, anti-static agents, flame-retardant agents, thickeners, thixotropic agents, surface-active agents, viscosity modifiers, extending oils, plasticizers, tackifiers, catalysts, sensitizers, stabilizers, lubricating agents; dispersing agents, hydrophobing agents, adhesive agents, flow improvers, defoaming agents, deaerators, diluents, auxiliaries, colorants, dyes and pigments.

The term "mono-reactive liquid crystal" as used in the context of the present invention denotes a liquid crystal having a single polymerizable functional group, preferably an unsaturated carbon-carbon bond. The unsaturated carbon-carbon bond preferably comprises double and/or triple bonds, and more preferably double bonds.

Preferably, the reactive additive has at least a single, preferably more than two polymerizable functional groups. Preferred are polymerizable functional groups, such as unsaturated carbon-carbon bonds, especially acrylate and methacrylate groups, more especially acrylate groups.

Cross-linkers are well known to the skilled person. Suitable compounds are described e.g. in patent publications EP 0 331 233, WO 95/24454, U.S. Pat. No. 5,567,349, U.S. Pat. No. 5,650,534, WO 00/04110, WO 00/07975, WO 00/48985, WO 00/55110 and WO 00/63154.

Reactive additive may be selected from but are not limited to monomers bearing norbornene, vinyl ether, vinyl ester, allyl ether, allyl ester, propenyl ether, allyl triazine, allyl isocyanurate, alkene, acrylate, unsaturated ester, imide, maleimide, methacrylate, acrylonitrile, styrene, diene, vinyl amide and alkyne polymerizable groups.

Most preferably from the group given below:
alkyne, alkene, vinyl ether, vinyl ester, allyl ether, allyl ester, acrylate and methacrylate.

Especially most preferably, the polymerizable functional group of the reactive additives having an unsaturated carbon-carbon bond are acrylate or methacrylate such as: trimethylolpropane triacrylate; ethylene diacrylate; tetraethylene glycol diacrylate; 1,6-hexanediol diacrylate; pentaerythritol triacrylate; diethylene glycol diacrylate; 1,4-butanediol diacrylate; pentaerythritol tetraacrylate; 1,3-butanediol diacrylate; triethylene glycol diacrylate; neopentyl glycol diacrylate; 2-butene-1,4-diacrylate; 1,3-bis[(acryloxymethyl)phenethyl]tetramethyldisiloxane; tripropylene glycol diacrylate; trimethylolpropane ethoxylate triacrylate; 1,2-propanediol diacrylate; 1,3-propanediol diacrylate; 2,2,3,3,4,4,5,5-octafluorohexane-1,6-diacrylate; 1,5-pentanediol diacrylate; bisphenol a diacrylate; bisphenol a propoxylate diacrylate; 1,10-decanediol diacrylate; 2,2-dibromoneopentyl glycol diacrylate; 3,3'-dimethyl bisphenol "a" diacrylate; dipentaerythritol pentaacrylate; ethoxylated bisphenol a diacrylate; ethoxylated tetrabromo bisphenol a diacrylate; glyceryl propoxy triacrylate; 4,4'-(hexafluoroisopropylidene) diphenyl diacrylate; 1,9-nonanediol diacrylate; pentaerythritol dimethacrylate; hydroquinone diacrylate; sorbitol diacrylate; sorbitol pentaacrylate; 2,2',6,6'-tetrabromo bisphenol a diacrylate; 2,2',6,6'-tetrachloro bisphenol a diacrylate; tetraethoxy bisphenol a diacrylate; 2,2,3,3-tetrafluoro-1,4-butanediacrylate; thiol diethylene glycol diacrylate; 1,1,1-trimethylol ethane triacrylate; tris(2-hydroxy ethyl) isocyanurate triacrylate; 5-ethyl-5-(hydroxymethyl)-beta,beta-dimethyl-1,3-dioxane-2-ethanol diacrylate; 1,6-hexanediylbis[oxy(2-hydroxy-3,1-propanediyl)]bisacrylate; kayarad r-551; kayarad peg400da; 1,4-cyclohexanedimethyl 1,4-diacrylate; glycerol propoxylate triacrylate; dipentaerythritol penta- & hexa-acrylate; di(trimethylolpropane) tetraacrylate; neopentyl glycol ethoxylate diacrylate; pentaerythritol diacrylate monostearate; trimethylolpropane ethoxylate methyl ether diacrylate; (3-(allanoyloxy)-5-[4-(benzoylamino)-2-oxopyrimidin-[(2h)-yl]tetrahydrofuran-2-yl; 1,3-phenylene diacrylate; fluorescein dimethacrylate; 3-hydroxy-2,2-dimethylpropyl 3-hydroxy-2,2-dimethylpropionate diacrylate; 2,2',6,6'-tetrabromo bisphenol "a" diacrylate; bisphenol a glycerolate (1 glycerol/phenol) diacrylate; trimethylolpropane benzoate diacrylate; propylene glycol glycerolate diacrylate; tri(propylene glycol) glycerolate diacrylate; glycerol 1,3-diglycerolate diacrylate; hydroxypivalyl hydroxypivalate bis[6-(acryloyloxy)hexanoate]; 1,6-hexanediol propoxylate diacrylate; pentaerythritol propoxylate triacrylate; 1,6-hexanediol ethoxylate diacrylate; 2,2,3,3,4,4-hexafluoro-1,5-pentyl diacrylate; 2,2,3,3,4,4,5,5-octafluoro-1,6-hexyl diacrylate; tricyclo[5.2.1.02,6]decanedimethanol diacrylate.

More preferably the liquid crystal has at least two polymerizable, unsaturated carbon-carbon bonds of formula (II)

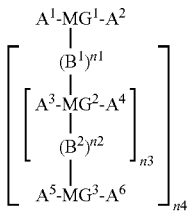

(II)

wherein:

$A^1$ to $A^6$ are independently from each other hydrogen, a polar group, an unsubstituted or substituted methyl group, or an unsubstituted or substituted hydrocarbon group of 2 to 40 C-atoms, in which one or more C-atoms are replaced or not replaced by a heteroatom, in such a way that oxygen atoms are not linked to one another, or in which one or more C-atoms replaced or not replaced by an unsubstituted or substituted aromatic, carbocyclic or heterocyclic group; and wherein the hydrocarbon group includes or does not include polymerizable functional groups having an unsaturated carbon-carbon bond; with the proviso that at least one, preferably two, of $A^1$ to $A^6$ comprises a polymerizable functional group having an unsaturated carbon-carbon bond;

$B^1$ and $B^2$ each independently represent a single bond, an oxygen atom or an optionally-substituted hydrocarbon group of 1 to 80 C-atoms, in which one or more C-atoms may be replaced by a heteroatom, in such a way that oxygen atoms are not linked to one another;

$MG^1$ has the meaning of formula (III)

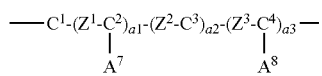

(III)

wherein $C^1$ to $C^4$ are independently from each other substituted or unsubstituted non-aromatic, aromatic, carbocyclic or heterocyclic groups, preferably connected to each other at the opposite positions via the bridging groups $Z^1$ to $Z^3$, $Z^1$ to $Z^3$ are independently from each other —CH(OH)—, —CO—, —CH$_2$(CO)—, —SO—, —CH$_2$(SO)—, —SO$_2$—, —CH$_2$(SO$_2$)—, —COO—, —OCO—, —COCF$_2$—, —CF$_2$CO—, —S—CO—, —CO—S—, —SOO—, —OSO—, —SOS—, —CH$_2$—CH$_2$—, —OCH$_2$—, —CH$_2$O—, —CH=CH—, —CH≡C—, CH=CH—COO—, —OCO—CH=CH—, —CH=N—, —CH(CH$_3$)=N—, —N=N— or a single covalent bond, $a_1$, $a_2$ and $a_3$ are independently from each other integers from 0 to 3, such that $1 \leq a_1+a_2+a_3 \leq 3$, $A^7$ and $A^8$ have the same meaning as $A^1$ to $A^6$ as given above;

$MG^2$ and $MG^3$ have independently from each other the meaning of formula (IV)

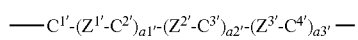

(IV)

wherein $C^{1'}$ to $C^{4'}$, $Z^{1'}$ to $Z^{3'}$, $a_{1'}$, $a_{2'}$ and $a_{3'}$, have the same meanings and preferences as the corresponding "letter$^{number'}$": $C^1$ to $C^4$, $Z^1$ to $Z^3$, $a_1$, $a_2$ and $a_3$;

$n_1$ and $n_2$ are independently from each other 1 or 2, where "$n_1=2$" (or "$n_2=2$") indicates the presence of two separate linkages via the groups $B_1$ (or the groups $B_2$) between the groups $MG_1$ and $MG_2$ (or $MG_2$ and $MG_3$); and $n_3$ is an integer from 0 to 1000; preferably from 0 to 5 and more preferably from 0 or 1;

$n_4$ is 0 or 1.

In the context of the present invention the term "hydrocarbon" includes straight-chain or branched alkylene, as well as saturated and unsaturated groups, and optionally substituted aromatic, carbocyclic or heterocyclic groups.

The term "aromatic monocyclic" includes rings of five or six atoms, two adjacent monocyclic rings of five or six atoms, a bicyclic ring system of eight, nine or ten atoms, or a tricyclic ring system of thirteen or fourteen atoms; preferably, the term "aromatic", as used in the context of the present invention, preferably denotes unsubstituted or substituted carbocyclic and heterocyclic groups, incorporating five, six, ten or 14 ring atoms, e.g. furan, benzene or phenylene, pyridine, pyrimidine, naphthalene, which may form ring assemblies, such as biphenylene or triphenylene, which are uninterrupted or interrupted by at least a single heteroatom and/or at least a single bridging group; or fused polycyclic systems, such as phenanthrene, tetraline. Preferably, aromatic group are benzene, phenylene, biphenylene or triphenylen. More preferred aromatic groups are benzene, phenylene and biphenylene.

A carbocyclic or heterocyclic aromatic group incorporates preferably five, six, ten or 14 ring atoms, as for example furan, benzene, pyridine, triazine, pyrimidine, naphthalene, phenanthrene, biphenylene or tetraline units, preferably naphthalene, phenanthrene, biphenylene or phenylene, more preferably naphthalene, biphenylene or phenylene, and most preferably phenylene.

The aromatic, carbocyclic or heterocyclic group is for example unsubstituted or mono- or poly-substituted. Preferred substituents of carbocyclic or heterocyclic aromatic groups are at least one halogen, hydroxyl, a polar group, acryloyloxy, alkylacryloyloxy, alkoxy, alkylcarbonyloxy, alkyloxycarbonyloxy, alkyloxocarbonyloxy, methacryloyloxy, vinyl, vinyloxy and/or allyloxy group, wherein the alkyl residue has preferably from 1 to 20 carbon atoms, and more preferably having from 1 to 10 carbon atoms. Preferred polar groups are nitro, cyano or a carboxy group, and/or a cyclic, straight-chain or branched $C_1$-$C_{30}$alkyl, which is unsubstituted, mono- or poly-substituted. Preferred substitutents of $C_1$-$C_{30}$alkyl are methyl, fluorine and/or chlorine, wherein one or more, preferably non-adjacent, —CH$_2$— group may independently of each other be replaced by a linking group. Preferably, the linking group is selected from —O—, —CO—, —COO— and/or —OCO—.

A monocyclic ring of five or six atoms is for example furan, benzene, preferably phenylene, pyridine, pyrimidine.

A bicyclic ring system of eight, nine or ten atoms is for example naphthalene, biphenylene or tetraline.

A tricyclic ring system of thirteen or fourteen atoms is for example phenanthrene.

The term "phenylene", as used in the context of the present invention, preferably denotes a 1,2-, 1,3- or 1,4-phenylene group, which is optionally substituted. It is preferred that the phenylene group is either a 1,3- or a 1,4-phenylene group. 1,4-phenylene groups are especially preferred.

The term "halogen" denotes a chloro, fluoro, bromo or iodo substituent, preferably a chloro or fluoro substituent.

The term "polar group", as used in the context of the present invention primarily denotes a group like a nitro, cyano, or a carboxy group.

The term "heteroatom", as used in the context of the present invention primarily denotes oxygen, sulphur and nitrogen, preferably oxygen and nitrogen, in the latter case preferably in the form of —NH—. In the case of nitrogen as heteroatom further substitution is possible with groups such as alkyl, aryl and cycloalkyl.

The term "substituted" as used in the context of the present invention primarily means substituted by lower alkyl, such as $C_1$-$C_6$alkyl, lower alkoxy, such as $C_1$-$C_6$alkoxy, aryl and cycloalkyl groups, as well as amino, cyano, carboxy, epoxy, halogen, hydroxy, nitro, oxo and hydroxyl.

Preferably, at least one of $A^1$ and $A^8$ comprises independently from each other a compound residue formula (V):

wherein:
P is hydrogen or a polar group, preferably nitro, cyano, a halogen; or an unsubstituted or substituted methyl group, or a polymerizable functional group having an unsaturated carbon-carbon bond selected from groups comprising norbornene, vinyl ether, vinyl ester, allyl ether, allyl ester, propenyl ether, allyl triazine, allyl isocyanurate, alkene, alkyne, acrylate, unsaturated ester, imides, maleimide, methacrylate, acrylonitrile, styrene, diene, vinyl amide and allylamide;

Sp is an unsubstituted or substituted straight chain or branched $C_{1-30}$ alkylene group, in which one or more —$CH_2$— groups may be replaced by a heteroatom and/or by a polar group and/or it is optionally possible that one or more carbon-carbon single bond(s) is/are replaced by a carbon-carbon double or a triple bond, and/or is replaced by at least one optionally substituted aromatic, carbocyclic or heterocyclic group, k is an integer having a value of from 0 to 4, X is —O—, —S—, —NH—, —N($CH_3$)—, —CH(OH)—, —CO—, —$CH_2$(CO)—, —SO—, —$CH_2$(SO)—, —$SO_2$—, —$CH_2$($SO_2$)—, —COO—, —S—CO—, —CO—S—, —SOO—, —OSO—, —SOS—, —$CH_2$—$CH_2$—, —$CH_2$O—, —CH=CH—, C≡C—, or a single bond, t is an integer having a value of 0 or 1.

The $C_{1-30}$ alkylene or $C_{1-20}$ alkylene group Sp may comprise branched or straight chain alkylene groups and may be unsubstituted, mono- or polysubstituted by alkyl, aryl, cycloalkyl, amino, cyano, epoxy, halogen, hydroxyl, nitro, especially by F, Cl, Br, I or CN. Alternatively or in addition one or more of $CH_2$ groups present in the hydrocarbon chain may be replaced, independently, by one or more groups selected from —O—, —S—, —NH—, N($CH_3$)—, —CH(OH)—, —CO—, —$CH_2$(CO)—, —SO—, —$CH_2$(SO)—, —$SO_2$—, —$CH_2$($SO_2$)—, —COO—, —OCO—, —OCO—O—, —S—CO—, —CO—S—, —SOO—, —OSO—, —SOS—, —C≡C—, —($CF_2$)$_{r1}$—, —($CH_2$)$_{s1}$— or C($W_1$)=C($W_2$)—, with the proviso that two oxygen atoms are not directly linked to each other. $W_1$ and $W_2$ each represent, independently, H, H—($CH_2$)$_{q2}$— or Cl. The integer r1, s2 and q2 each independently represent a number of between 1 and 15.

Preferably, Sp represents an $C_{1-20}$ alkylene group, more preferably an $C_{1-13}$ alkylene group, which is unsubstituted or substituted with alkyl, aryl, cycloalkyl, amino, cyano, epoxy, halogen, hydroxyl, nitro and in which one or more —$CH_2$— groups may be replaced by a heteroatom; and/or is replaced by at least one optionally substituted aromatic, carbocyclic or heterocyclic group, within the above given meanings and preferences.

Preferably, P is hydrogen, nitro, cyano, a halogen, an unsubstituted or substituted methyl group, or a polymerizable functional group having an unsaturated carbon-carbon bond selected from groups comprising vinyl ether, vinyl ester, allyl ether, allyl ester, propenyl ether, alkene, alkyne, acrylate, unsaturated ester and methacrylate, and preferably selected from groups comprising acrylate and methacrylate.

Preferably, X represents —O—, —CO—, —COO—, —OCO—, —C=C— and more preferably X is —O—, —COO— or —OCO—.

Further preferred,

Sp represents an $C_{1-20}$ straight chain alkylene group, more preferably an $C_{1-13}$ alkylene group, which is unsubstituted or substituted with alkyl, aryl cycloalkyl, amino cyano, epoxy, halogen, hydroxyl or nitro, in which one or more C-atoms may be replaced by a heteroatom and/or is replaced by at least one optionally substituted aromatic, carbocyclic or heterocyclic group;

X represents —O—, —CO—, —COO—, —OCO—, —C=C—, and preferably X is —O—, —COO—, —OCO—, and P is hydrogen or a polymerizable functional group having an unsaturated carbon-carbon bond selected from groups comprising vinyl ether, vinyl ester, allyl ether, allyl ester, acrylate, methacrylate-, and preferably-O—, —COO—, —OCO—.

Preferably, $B^1$ and/or $B^2$ comprise independently from each other a group of formula (VI):

wherein:

$Sp^2$ represents a $C_{1-20}$ alkylene group;

$X^4$ and $X^5$ each independently represent —O—, —S—, —NH—, N($CH_3$)—, —CH(OH)—, —CO—, —$CH_2$(CO)—, —SO—, —$CH_2$(SO)—, —$SO_2$—, —$CH_2$($SO_2$)—, —COO—, —OCO—, —OCO—O—, —S—CO—, —CO—S—, —SOO—, —OSO—, —SOS—, —$CH_2$—$CH_2$—, —$OCH_2$—, —$CH_2$O—, —CH=CH—, —C≡C— or a single bond;

k2 is an integer, having a value of 0 or 1;

t2 and t3 are integers, each independently having a value of 0 or 1;

with the proviso that oxygen atoms are not linked one to another.

Preferably $B^1$ and $B^2$ each independently represent a group of formula (VI), wherein:

$X^4$ and $X^5$ each independently represent —O—, —CO—, —COO—, —OCO—, —C=C—, or a single bond, especially —O—, —COO—, —OCO— or a single bond; and $Sp_2$ represents a $C_{1-20}$ straight-chain alkylene group, especially ethylene, propylene, butylene, pentylene, hexylene, heptylene, octylene, nonylene, decylene, undecylene or dodecylene.

An especially preferred polymer is that in which $B^1$ and $B^2$ each independently represent a group of formula (VI) and $A^1$ to $A^8$ each independently represent a group of formula (V).

Preferably, $C^1$ to $C^4$ are selected from:

[Structures shown: cyclohexylene with $(L)_{u1}$, phenylene with $(L)_{u1}$, pyridine with $(L)_{u2}$, pyridine with $(L)_{u3}$, pyrimidine with L, decalin with $(L)_{u1}$, naphthylene with $(L)_{u2}$, phenanthrylene with $(L)_{u1}$, $(L)_{u2}$, $(L)_{u3}$, carbazole with $(L)_{u2}$, $(L)_{u1}$, pyridazine with $(L)_{u2}$, $(L)_{u3}$, furan, thiophene, oxadiazole, and thiadiazole]

wherein:
L is —CH$_3$, —COCH$_3$, —NO$_2$, —CN or halogen,
u1 is 0, 1, 2, 3, or 4,
u2 is 0, 1, 2, or 3,
u3 is 0, 1, or 2.

More preferably, $C^1$ to $C^4$ are selected from: cyclohexylene, phenylene, naphthylene or phenanthrylene.

Most preferably $C^1$ to $C^4$ are selected from: phenylene

Preferably, $Z^1$ to $Z^3$ represent independently from each other —COO—, —OCO—, —CH$_2$—CH$_2$—, —OCH$_2$—, —CH$_2$O—, —CH=CH—, —C≡C—, —CH=CH—COO—, —OCO—CH=CH— or a single covalent bond.

More preferably, $Z^1$ to $Z^3$ represent independently from each other —COO—, —OCO—, —CH=CH—COO—, —OCO—CH=CH— or a single covalent bond.

Most preferred is a liquid crystal according to the present invention of formula (VII)

$$A^1\text{-}C^1\text{-}(Z^1\text{-}C^2)_{a1}\text{-}(Z^2\text{-}C^3)_{a2}\text{-}A^2$$
$$|$$
$$A^7$$

(VII)

wherein:
$A^1, A^2, A^7, C^1, C^2, C^3, Z^1$ and $Z^2$ and a1 and a2 have the same meanings and preferences as given above.

Further especially most preferred is a compound of formula (VII), wherein:
$A^1$ and $A^2$ are independently from each other a compound formula (V):

$$P\text{—}(Sp)_k\text{-}(X)_t\text{—}$$

(V)

wherein
P is a polymerizable functional group having an unsaturated carbon-carbon bond selected from groups comprising vinyl ether, vinyl ester, allyl ether, allyl ester, propenyl ether, alkene, alkyne, acrylate, unsaturated ester and methacrylate, and preferably selected from groups comprising acrylate and methacrylate;
preferably P is identical in $A^1$ and $A^2$;

Sp represents an $C_{1-20}$ alkylene group, more preferably an $C_{1-13}$ alkylene group, which is unsubstituted or substituted with alkyl, aryl, cycloalkyl, amino, cyano, epoxy, halogen, hydroxyl, nitro and in which one or more —CH$_2$— groups may be replaced by a heteroatom; and/or is replaced by at least one optionally substituted aromatic, carbocyclic or heterocyclic group, within the above given meanings and preferences;

X represents —O—, —CO—, —COO—, —OCO—, —C=C— and more preferably X is —O—, —COO—, —OCO—;

k is an integer having a value from 0 to 4,
t is an integer having a value of 0 or 1; and/or
$A^7$ has the same meanings and preferences as given above; preferably $A^7$ is hydrogen or a polar group, preferably nitro, cyano, a halogen, an unsubstituted or substituted methyl group, or a polymerizable functional group having an unsaturated carbon-carbon bond within the above given meanings and preferences; preferably, $A^7$ is hydrogen or a polar group, preferably nitro, cyano, a halogen, an unsubstituted or substituted methyl group and/or $C^1, C^2$ and $C^3$ are identical the same meanings and preferences as given above; especially $C^1, C^2$ and $C^3$ are phenylen; and/or $Z^1$ and $Z^2$ are the equal and have the same meanings and preferences as given above; preferably, $Z^1$ and $Z^2$ are —COO—, —OCO—, —CH=CH—COO—, —OCO—CH=CH— or a single bond; if one of $Z^1$ and $Z^2$ is a single bond, then the other Z is preferably —COO—, —OCO—, —CH=CH—COO— or —OCO—CH=CH—.

In addition, most preferred $A^1$ and $A^2$ are identical.
Further, most preferred is a liquid crystal polymer according to the present invention of formula (VIII)

$$A^1\text{-}C^1\text{-}(Z^1\text{-}C^2)_{a1}\text{-}(Z^2\text{-}C^3)_{a2}\text{-}A^2$$
$$|$$
$$B^1$$
$$|$$
$$A^5\text{-}C^{1'}\text{-}(Z^{1'}\text{-}C^{2'})_{a1'}\text{-}(Z^{2'}\text{-}C^{3'})_{a2'}\text{-}A^6$$

(VIII)

wherein:
$A^1, A^2, A^5, A^6, C^1, C^2, C^3, B^1, Z^1$ and $Z^2, C^{1'}, C^{2'}, C^{3'}, Z^{1'}$ and $Z^{2'}$ and a1, a2, a1' and a2' have the same meanings and preferences as given above.

Further especially most preferred is compound of formula (VIII), wherein
$A^1, A^2, A^5, A^6$ are independently from each other a compound residue formula (V):

$$P\text{—}(Sp)_k\text{-}(X)_t\text{—}$$

(V)

wherein
P is a polymerizable functional group having an unsaturated carbon-carbon bond selected from groups comprising vinyl ether, vinyl ester, allyl ether, allyl ester, propenyl ether, alkene, alkyne, acrylate, unsaturated ester and methacrylate, and preferably selected from groups comprising acrylate and methacrylate; preferably P is identical in $A^1$, $A^2$, $A^5$, $A^6$;

Sp represents an $C_{1-20}$ alkylene group, more preferably an $C_{1-13}$ alkylene group, which is unsubstituted or substituted with alkyl, aryl, cycloalkyl, amino, cyano, epoxy, halogen, hydroxyl, nitro and in which one or more —$CH_2$— groups may be replaced by a heteroatom; and/or is replaced by at least one optionally substituted aromatic, carbocyclic or heterocyclic group, within the above given meanings and preferences;

X represents —O—, —CO—, —COO—, —OCO—, —C═C— and more preferably X is —O—, —COO—, —OCO—;

k is an integer having a value of from 0 to 4,
t is an integer having a value of 0 or 1;
preferably $A^1$, $A^2$, $A^5$, $A^6$ are identical;
and/or
$B^1$ comprises a group of formula (VI):

wherein:
$Sp^2$ represents a $C_{1-20}$ alkylene group;
$X^4$ and $X^5$ each independently represent —O—, —S—, —NH—, N($CH_3$)—, —CH(OH)—, —CO—, —$CH_2$(CO)—, —SO—, —$CH_2$(SO)—, —$SO_2$—, —$CH_2$($SO_2$)—, —COO—, —OCO—, —OCO—O—, —S—CO—, —CO—S—, —SOO—, —OSO—, —SOS—, —$CH_2$—$CH_2$—, —$OCH_2$—, —$CH_2$O—, —CH═CH—, —C≡C— or a single bond;
k2 is an integer, having a value of 0 or 1;
t2 and t3 are integers, each independently having a value of 0 or 1; with the proviso that oxygen atoms are not linked one to another;
preferably, $B^1$ represents a group of formula (VI), wherein:
$X^4$ and $X^5$ each independently represent —O—, —CO—, —COO—, —C═C—, or a single bond, especially —O—, —COO—, —OCO— or a single bond; and
$Sp^2$ represents a $C_{1-20}$ straight-chain alkylene group, especially ethylene, propylene, butylene, pentylene, hexylene, heptylene, octylene, nonylene, decylene, undecylene or dodecylene; and/or
$C_1'$, $C_2'$ and $C_3'$ and $C_1$, $C_2$ and $C_3$ are identical and have the same meanings and preferences as given above; especially $C_1'$, $C_2'$ and $C_3'$ and $C_1$, $C_2$ and $C_3$ are phenylen; and/or
$Z^1$ and $Z^2$ and $Z^{1'}$ and $Z^{2'}$ are the equal and have the same meanings and preferences as given above; preferably, $Z^1$ and $Z^2$ and $Z^{1'}$ and $Z^{2'}$ are —COO—, —OCO—, —CH═CH—COO—, —OCO—CH═CH— or a single bond; if one of $Z^1$ and $Z^2$ is a single bond, then the other Z is preferably —COO—, —OCO—, —CH═CH—COO— or —OCO—CH═CH—, and if one of $Z^{1'}$ and $Z^{2'}$ is a single bond, then the other Z is preferably —COO—, —OCO—, —CH═CH—COO— or —OCO—CH═CH.

The present invention relates also to a composition (XX) comprising
a) at least one polythiol of formula (IX)

wherein
$X^a$ is an aliphatic organic residue,
n' is an integer ≥2, preferably an integer from 2 to 10, more preferably 3 or 4 and b) at least one liquid crystal having at least two polymerizable functional groups, and
c) optionally at least one reactive and/or non-reactive additive(s), and
d) optionally at least one initiator(s), and
e) optionally at least one solvent(s).

Preferred is a composition of the invention, wherein esters of pentaerythritol tetrakis(β-dodecylmercapto)propionate are excluded.

Further preferred is a composition of the invention wherein the liquid crystal compound is present in an amount of >50% by weight to the total weight of the composition.

In addition preferably, the present invention relates to the liquid crystal polymer given above, which does not contain a cationic photoinitiator.

In a further preferred embodiment, the solvent represents less than 50 weight % of the formulation, preferably less than 30 weight %, more preferably less than 10 weight %.

In a preferred embodiment of the invention the composition comprises an initiator.

The liquid crystal, polythiol, aliphatic organic residue, polymerizable functional groups and non-reactive additives have the same meanings and preferences as given above.

Especially preferably, $X^a$ is a polyvalent aliphatic, organic residue of an organic ester of —$C_1$-$C_{10}$alkylen-COOH with polyhydroxy compounds, such as for example glycols, triols, tetraols, pentaols or hexaols.

More preferred, $X^a$ is an ester of glycolic acid (—$CH_2$COOH), alpha-propionic acid (—CH($CH_3$)—COOH and beta-propionic acid (—$CH_2CH_2$COOH) with polyhydroxy compounds such as for example glycols, triols, tetraols, pentaols or hexaols.

Preferred are polythiols of an organic ester of HS—$C_1$-$C_{10}$alkylen-COOH, preferably HS—$C_1$-$C_4$alkylen-COOH, most preferably HS—$C_2$-$C_3$alkylen-COOH with polyhydroxy compounds, such as for example glycols, triols, tetraols, pentaols or hexaols.

More preferred are polythiols of an ester of thioglycolic acid (HS—$CH_2$COOH), alpha-mercaptopropionic acid (HS—CH($CH_3$)—COOH and beta-mercaptopropionic acid (HS—$CH_2CH_2$COOH) with polyhydroxy compounds such as for example glycols, triols, tetraols, pentaols or hexaols.

Especially most preferred polythiols are glycolate and propionate esters such as ethylene glycol bis(thioglycolate), ethylene glycol bis(beta-mercaptopropionate), trimethylolpropane tris(thioglycolate), trimethylolpropane tris(beta-mercaptopropionate), pentaerythritol tetrakis(beta-mercaptopropionate), glycol dimercaptoacetate, 1,2,6-hexanetriol trithioglycolate, trimethylolethane trithioglycolate, pentaerythritol tetra(mercaptoacetate), trimethylolpropane trithioglycolate and glycetryl thioglycolate; and propionate esters such as trimethylolethane tri-(3-mercapto propanate), pentaerythritol tetrakis(3-mercaptopropionate), trimethylolpropane tri(3-mercapto propionate) or glycol dimercaptopropionate, all of which are commercially available, or are accessible by methods known in the art.

Polymerization might be carried out with or without an initiator, preferably with initiator. Whether an initiator is used or not depends on the kind of starting materials and process parameters. Any type of initiators may be selected except cationic photoinitiators. Preferred are radical initiators. The initiator might be a thermal or photo-initiator or a combination thereof. More preferred are radical photo-initiators.

Conventionally, the photo-initiators absorb at the wavelength of the actinic radiation. When polymerization is carried out by means of UV light, a photo-initiator can be used that decomposes under UV irradiation to produce free radicals or ions that start the polymerization reaction. UV photoinitiators are preferred, in particular radical UV photoinitiators. Examples of free radical photo-initiators or maleimide photo-initiators are described by Dias et. al. (Surface Coatings International, JOCCA 2000, 10, 502-506 and WO-01/27040).

As standard photoinitiator for radical polymerization for example the commercially available: Irgacure® 907, Irgacure® 651, Irgacure® 369, Irgacure® 184, Darocure® 1173 or Darocure® 4205 (all from Ciba Specialty Chemicals) can be used.

Non-reactive additives relates for example to antioxidants, accelerators, dyes, inhibitors, activators, fillers, pigments, anti-static agents, flame-retardant agents, thickeners, thixotropic agents, surface-active agents, viscosity modifiers, extending oils, plasticizers, tackifiers, catalysts, sensitizers, stabilizers, such as e.g. phenol derivatives, such as 4-ethoxyphenol or 2,6-di-tert-butyl-4-methylphenol (BHT), lubricating agents; dispersing agents, hydrophobing agents, adhesive agents, flow improvers, defoaming agents, deaerators, diluents, curing inhibitors, auxiliaries, colorants, dyes, pigments or a photo-orientable monomer or oligomer or polymer as described in EP 1 090 325 B;

Especially, if color filters are required, dyes may be added to the compositions of the invention.

Conventional curing inhibitors or retarders which may be used in order to stabilize the components or curable compositions so as to prevent premature onset of curing may include hydroquinone; p-tert.-butyl catechol; 2,6-di tert.-butyl-p-methylphenol; phenothiazine; N-phenyl-2-naphthylamine.

The composition is solid, or diluted in a solvent, which is an organic solvent and/or water, as a solution, gel, dispersion or emulsion.

Preferably, the composition is a clear solution. The solvent or solvent mixture used in the present application may be any compound that can dissolve the liquid crystal composition according to the invention. At least one solvent such as a common polar solvent or a nonpolar solvent may be used. The solvents which are particularly preferred are those leading to a good coatability or printability of the solution of the material to the substrate to be coated.

Non-polar solvents are compounds that have low dielectric constants and are not miscible with water, such as for example hexane, benzene, toluene, diethyl ether, chloroform, ethyl acetate, dichloromethane.

Polar solvent are aprotic or protic.

Polar aprotic solvents are solvents that share ion dissolving power with protic solvents but lack an acidic hydrogen. These solvents generally have high dielectric constants and high polarity. Examples are 1,4-dioxane, tetrahydrofuran (THF), acetone, acetonitrile (MeCN), dimethylformamide (DMF), dimethyl sulfoxide (DMSO), N-methylpyrrolidone (NMP), ethylpyrrolidone, N-vinylpyrrolidone, 2-butoxyethanol (BC), gamma.-butyrolactone (BL), N-methylmorpholine, gamma.-butyrolactone, acetonitrile, ethylcarbitol, butylcarbitol, ethylcarbitol acetate, ethylene glycol, propylene glycol monoacetate, propylene glycol diacetate, dipropylene glycol, and dipropylene glycol monomethyl ether, chlorobenzene, tetrahydrofuran, butylcellosolve, cyclopentanone (CP), methylethylketone (MEK), ethyl acetate (EA), anisole (AN), cyclohexanone (CHN), methyl isobutyl ketone (MIBK), 1-methoxy-2-propanol acetate (MPA), N,N-dimethyl-formamide (DMF), dichloromethane, gamma-butyrolactone (BL), and mixtures thereof.

Polar protic solvents are solvents, which contain dissociable H+, such as hydrogen fluoride. The molecules of such solvents can donate an H+ (proton). Conversely, aprotic solvents cannot donate hydrogen bonds. Common characteristics of protic solvents are to display hydrogen bonding, to have an acidic hydrogen (although they may be very weak acids), to be able to stabilize ions (cations by unshared free electron pairs, anions by hydrogen bonding). Examples are acetic acid, n-butanol, isopropanol, n-propanol, ethanol, methanol, formic acid and water.

Preferably the organic solvents used in the present application are protic or aprotic polar or non-polar solvents.

Preferred solvents are, however not limited to:
ketones such as for example acetone, cyclopentanone (CP), cyclohexanone (CH), methyl isobutyl ketone (MIBK), methylethylketone (MEK),
amides such as N,N-dimethylformamide (DMF), N-methylpyrrolidone (NMP), M-ethylpyrrolidone, N-vinylpyrrolidone, N,N-dimethylacetamide,
carbamates
ether such as anisole (AN), tetrahydrofuran (THF), ethylene glycol, dipropylene glycol, butylcarbitol, ethylcarbitol acetate, dipropylene glycol monomethyl ether,
ester such as ethyl acetate (EA), 1-methoxy-2-propanol acetate (MPA), gamma-butyrolactone (BL), propylene glycol monoacetate, propylene glycol diacetate, dipropylene glycol monomethyl ether,
alcohols, such as 2-butoxyethanol (BC), ethylcellosolve, butylcellosolve,
dimethyl sulfoxide (DMSO),
halogen hydrocarbons such as dichloromethane, chlorobenzene,
apolar solvents as for example, however not limited to hydrocarbons, such as hexane, heptane, toluene; petrolether.
and mixtures thereof.

More preferred solvents are acetone, cyclopentanone (CP), cyclohexanone (CH), methyl isobutyl ketone (MIBK), methylethylketone (MEK), N,N-dimethylformamide (DMF), N-methylpyrrolidone (NMP), N-ethylpyrrolidone, N-vinylpyrrolidone, N,N-dimethylacetamide, (AN), tetrahydrofuran (THF), ethylene glycol, dipropylene glycol, butylcarbitol, ethylcarbitol acetate, dipropylene glycol monomethyl ether, ethyl acetate (EA), 1-methoxy-2-propanol acetate (MPA), gamma-butyrolactone (BL), propylene glycol monoacetate, propylene glycol diacetate, dipropylene glycol monomethyl ether, dimethyl sulfoxide (DMSO).

Most preferred are cyclopentanone (CP), cyclohexanone (CH), methyl isobutyl ketone (MIBK), methylethylketone (MEK), ethyl acetate (EA), 1-methoxy-2-propanol acetate (MPA), dimethyl sulfoxide (DMSO).

The amount of the reactive or non reactive additives in the composition is limited by the liquid crystal phase of the film that is prepared from the composition (XX), which has to be preserved. Conventionally, the reactive or non reactive additives have an amount of 0.1 to 50% by weight of the composition, preferably an amount of 1 to 30% by weight, even more preferably an amount of 1 to 10% by weight.

In case the compositions of the invention comprise a stabilizer, the latter is generally present in an amount of 0.01 to 5% by weight of the composition, preferably in an amount of 0.1 to 1% by weight.

The initiator is employed in an amount effective for initiating cure of the formulation. The effective amount depends upon the process parameters and starting material properties. Typical, the amount ranges from 0.1 to 10% by weight relative to the total weight % of the composition, preferably from 0.5 to 8% by weight, more preferred from 1 to 5% by weight. Combinations of two or more initiators (photo- or thermal initiators) may also be employed.

Preferred liquid crystal polymer (I), (Ia) or (Ib) according to the present invention is prepared from a composition comprising a molar ratio of thiol groups of the polythiols to the unsaturated carbon-carbon bonds, which is <2; preferably which is in the range from about 0.005-1; more preferably 0.001-0.5 and most preferably 0.002-0.5.

Depending on the envisaged use, it can be of advantage to add a solvent. Typical concentrations of the composition disposed in a solvent are between 2 and 50%, preferred between 10 and 40% by weight of the active ingredients, such as the polythiol, the liquid crystal, and optionally the polymerization agent, initiator and additive, in said solvent.

In a further embodiment the present invention concerns the use of a composition (XX) according to the present invention for the preparation of an elastomer, liquid crystalline polymer gel, liquid crystalline polymer, liquid crystalline polymer network or liquid crystalline polymer film.

The compounds of the invention may be readily prepared using methods that are well known to the person skilled in the art, such as those documented in Houben-Weyl, *Methoden der Organischen Chemie*, Thieme-Verlag, Stuttgart, or in U.S. Pat. No. 6,630,076 or WO 2005/054406.

Different methods can be used for the formation of the desired liquid crystalline films or liquid crystalline networks, starting from the polymerizable composition (XX).

Substrates such as glass or plastic substrates, that can be optionally coated with indium tin oxide (ITO) may be used. For the preparation of liquid crystalline films or networks it is particularly important to avoid the formation of defects or inhomogenities. Thus preferred substrates include glass or plastic, especially those including an alignment layer, such as a layer of rubbed polyimide or polyamic acid or a layer of photo-oriented photopolymers (LPP). Said layers are used to allow uniform orientation of the liquid crystalline mixture. Uniform orientation can also be achieved by other methods known in the art. The polymerizable composition (XX) is applied on a substrate and polymerized. Preferably, the polymerizable applied composition (XXI) is photo-polymerized that means that it is cured using light, preferably UV light, to give a cross-linked liquid crystalline polymer (LCP) film. The curing time is dependent, inter alia, on the reactivity of the polymerizable material, the thickness of the coated layer, the type of the polymerization initiator and the power of the UV lamp. The curing time according to the invention is preferably not longer than 10 minutes, particularly preferably not longer than 5 minutes and very particularly preferably shorter than 2 minutes. For mass production short curing times of 1 minute or less, very preferably or 1 minutes or less, in particular of 10 seconds or less, are preferred. The film is mechanically resistant when exposed to light and temperature.

In the context of the present invention the term "radiation curing" and "photo-polymerization" are used as synonyms.

The present invention also relates to a process of the preparation of a liquid crystal polymer, especially a liquid crystal film or liquid crystal network comprising a) applying a composition (XX), wherein said composition has the same meaning and preferences as given above; and then
b) optionally drying, and then
c) polymerizing the applied composition (XXI), obtained after step a) or step b), which is preferably a film;
in an atmosphere containing oxygen, preferably with an amount of 0.1≤oxygen≤50%, more preferably 1≤oxygen≤25%, most preferably in air.

Preferably, the present invention relates to the process given above, wherein oxygen barrier layers, which exclude oxygen, are excluded.

Additionally preferred the present invention relates to the liquid crystal polymer given above, which is prepared using low UV lamp power and energy.

Further, the present invention relates to an applied composition (XXI), which is obtainable according to the process steps a) and optionally b) as described above.

In general the composition is applied by general coating and printing methods known in the art. Coating methods are for example spin coating, air doctor coating, blade coating, knife coating, reverse-roll coating, transfer roll coating, gravure roll coating, kiss roll coating, cast coating, spray coating, slot-orifice coating, calendar coating, electrodepositing coating, dip coating or die coating.

Printing methods are for example relief printing such as flexographic printing, ink jet printing, intaglio printing such as direct gravure printing or offset gravure printing, lithographic printing such as offset printing, or stencil printing such as screen printing.

It depends on the consistence of the composition whether a drying step is conducted. If solvents are comprised by the composition, the composition is usually dried after the applying step.

In general "drying" consists in the extraction of the solvent (s) for example by application of heated gas using for example an air stream that applies the heat by convection and carries away the vapor of solvents (convective or direct drying). Drying is faster at higher temperatures; however, the liquid crystal phase of the applied composition (XXI) has to be retained that limits the applicable temperature, preferably below the clearing point of the applied composition (XXI). In addition, product or film qualities also have to be considered in the determination of the temperature applied for the drying. Other possibilities are vacuum drying, where heat is supplied by contact conduction or radiation (or microwaves) while the produced vapor is removed by the vacuum system; indirect or contact drying (heating through a hot wall), as drum drying, vacuum drying; dielectric drying (radiofrequency or microwaves being absorbed inside the material); freeze drying or lyophilization; mechanical extraction of the solvent.

The reactive and/or non-reactive additives and the initiator of the composition are usually preblended with the polymerizable liquid crystal or polythiol prior to or during the process.

In a preferred embodiment of the invention, the process comprises photo-polymerizing the applied composition (XXI)

The photo-polymerizing is conducted by radiation.

In the context of the present invention radiation is polarized or unpolarized light.

Preferred is unpolarized light, but in specific cases polarized or partially polarized, linearly, circularly or elliptically polarized light can also be applied. Conventionally, a lamp is used for photo-polymerization. The intensity of the lamp used for the irradiation should be preferably higher than 0.2 mW/cm$^2$, more preferably higher than 10 mW/cm$^2$, most preferably higher than 20 mW/cm$^2$, especially most preferably higher that 50 mW/cm$^2$. Most likely the polymerization reaction may be initiated by most any actinic light source. Conventionally, polymerization is accomplished at ordinary room temperature conditions. A class of actinic light useful herein is ultraviolet light and other forms of actinic radiation which are normally found in radiation emitted from the sun or from artificial sources such as Type RS Sunlamps, carbon arc lamps, xenon arc lamps, mercury vapor lamps, tungsten halide lamps and the like. Ultraviolet radiation may be used most efficiently if the photocurable polyene/polythiol composition contains a suitable photo-polymerization rate accelerator. Curing periods may be adjusted to be very short and hence commercially economical by proper choice of ultraviolet source, photo-polymerization rate accelerator and concentration thereof, temperature and molecular weight, and reactive group functionality of the polymerizable liquid crystal and polythiol. The liquid crystal polymer is also accessible by electron beam (EB). This curing method does not necessarily require an initiator Optionally, the photo-polymerization may be conducted without a photoinitiator in a manner analogous to that described by Bowman where special UV light sources with strong emissions are used (Bowman et. al. Macromolecules 2002, 35, 5361-5365) and with use of maleimides as described in EP0618237.

The present invention also relates to a liquid crystal polymer, preferably one of formula (I), (Ia) or (Ib), which is obtainable by the process of the invention as described above, especially by polymerization of a composition according to the invention.

Preferably, the present invention relates to a liquid crystal polymer, preferably one of formula (I), (Ia) or (Ib), which is obtainable by the process of the invention as described above, especially by polymerization of a composition according to the invention, with the proviso that polymer dispersed liquid crystals are excluded.

The present invention also relates to the use of the liquid crystal polymers (I), liquid crystal films or networks of the applied composition (XXI) in the manufacture of unpatterned or patterned optical or electro-optical component and systems, especially multilayer systems, or devices.

An optical component, system or device creates, manipulates, or measures electromagnetic radiation.

An electro-optical component, system or device operates by modification of the optical properties of a material by an electric field. Thus it concerns the interaction between the electromagnetic (optical) and the electrical (electronic) states of materials.

The unpatterned or patterned optical or electro-optical component, can be used for (but are not limited to) a waveguide, a security or brand protection element, a bar code, an optical grating, a filter, a retarder, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non-linear optical properties, a decorative optical element, a brightness enhancement film, a component for wavelength-band-selective compensation, a component for multi-domain compensation, a component of multiview liquid crystal displays, an achromatic retarder, a polarization state correction/adjustment film, a component of optical or electro-optical sensors, a component of brightness enhancement film, a component for light-based telecommunication devices, a patterned G/H-polarizer with an anisotropic absorber, a patterned reflective circular polarizer, a patterned reflective linear polarizer, a patterned MC (monomer corrugated film).

Preferred are security elements, compensator and retardation films.

A further aspect of the invention provides an optical or electro-optical component and multi-layer system comprising a liquid crystalline polymer, a liquid crystalline polymer film or network according to the invention.

Preferably, patterning denotes to birefringence patterning and/or thickness patterning and/or patterning of the optical axis orientation, and/or patterning of the degree of polymerization. Birefringence denotes the difference between the extra-ordinary and the ordinary index of refraction.

The present invention also relates to methods for the preparation of a patterned liquid crystal polymer, especially a birefringent film, comprising patterning the polymerizable applied composition (XXI), preferably birefringence patterning and/or thickness patterning and/or patterning of the optical axis orientation, and/or patterning of the degree of polymerization, and further preferably comprising photo-polymerizing.

Further, the present invention relates to a patterned liquid crystal polymer (I), especially a birefringent film, or network and optical components including such patterned liquid crystal polymer.

In the context of the present invention a patterned liquid crystal polymer (I) is preferably a patterned film.

More preferably, the present invention relates to a method for the preparation of a patterned liquid crystal polymer (I), comprising a two dimensional patterning in the plane, or a three dimensional patterning in the space, whereby the pattern is periodic or non-periodic. Three dimensional forms are for example specific surface relief structures such as inclined or curved liquid crystal polymer structures like e.g. microlens or micro-prism structures.

The method for the preparation of a patterned liquid crystal polymer (I) provides a convenient way to prepare birefringent films with specific surface relief structures like e.g. microlens or micro-prism structures.

More preferably, patterning denotes to methods comprising radiation curing of the applied composition (XXI). Most preferably, the present invention relates to a method for the preparation of a patterned liquid crystal polymer by generating a patterned degree of polymerization comprising single or multiple exposure of applied composition (XXI) of the invention to radiation, preferably collimated radiation, through one or more masks and/or to radiation in the form of a scanning beam, and then optionally by rinsing the remaining unpolymerized liquid crystal or components of the liquid crystal composition.

The local degree of polymerization is quantifiable by a measurement of the local ratio of the unreacted polymerizable groups in the liquid crystal composition after the polymerization.

If high resolution of the patterning is envisaged, it is of advantage to use collimated radiation.

The area-selective polymerization is achieved by radiation induced polymerization, preferably radical polymerization, whereby the applied composition (XXI) consisting of un-polymerized liquid crystals (i.e. the wet film) is radiation exposed through a shadow or gray mask and/or by means of a scanning beam of radiation.

Polymerization denotes in the context of the present invention any reaction, according to which a polymer is accessible. Polymerization is for example any polymerization reaction, curing and crosslinking reaction. The term curing denotes polymerization.

Especially, most preferably, the present invention relates to a method for the preparation of a patterned liquid crystal polymer (I), comprising polymerizing the polymerizable applied composition (XXI) of the invention in a single exposure step or in a multiple exposure step
a) through a black/white or gray or spectrally selective mask, or through a black/white or gray or spectrally selective mask which might be re-positioned in between the exposure steps, or a black/white or gray or spectrally selective mask which might be replaced in between the exposure steps;

and/or b) through radiation in the form of a scanning beam.

In the context of the present invention, black/white mask means that the mask consists of fully transmissive and fully blocking zones for the respective radiation. Gray mask means that also zones with intermediate levels of transmission exist.

More preferably, the present invention relates to a method for the preparation of a patterned liquid crystal polymer (I), by patterning of the birefringence.

The influence of the process conditions on the birefringence can be exploited to pattern the applied composition (XXI). The birefringence within the polymerizable applied composition (XXI) or the liquid crystalline polymer (I) depends on the order parameter of the liquid crystal molecules. The order parameter can for example be influenced by the temperature of the polymerizable applied composition (XXI) or the liquid crystalline polymer (I). The influence of the temperature on the order parameter and thus on the birefringence depends on the degree of polymerization. A completely unpolymerized liquid crystal composition exhibits a strong dependence of the birefringence on the temperature. The dependence becomes weaker with increasing degree of polymerization. Thus, the above described patterning of the degree of polymerization can be used to induce a pattern of the birefringence by exposing the liquid crystal composition to a certain temperature. The thus generated pattern in the birefringence can be fixed by applying a second polymerization step.

Most preferably, the present invention relates to a method for the preparation of a patterned liquid crystal polymer (I), by patterning of the birefringence comprising a) single or multiple exposure of the polymerizable applied composition (XXI) or the liquid crystalline polymer (I) to radiation through one or more masks and/or to radiation in the form of a scanning beam, and b) subsequent second polymerization at elevated temperature, preferably at a temperature above the clearing point of the composition. Both thermally or photo-initiated polymerization are possible, preferred is photo-polymerization or a combination of thermally and photo-initiated polymerization.

Alternatively, a pattern in the birefringence can be generated by polymerizing the film locally under different conditions. Conditions which can influence the birefringence of the liquid crystal film during the patterning polymerization step are the temperature of the film, the intensity, dose, spectrum of the radiation used to initiate the polymerization, the atmosphere in which the film is stored during the polymerization. Combinations of those conditions are also possible. The local polymerization under varying conditions can be achieved by multiple radiation exposure through different or re-positioned masks or by means of a scanned beam of radiation used to initiate the polymerization.

The birefringence can additionally be patterned by means of a locally variable induced reaction process. The radiation preferably consists of electromagnetic radiation, preferably of visible and/or UV light and/or X-ray radiation and/or electron beam. The radiation can be applied through a black/white, gray or wavelength selective mask or by scanning of radiation beams over the area of the birefringent film. Optionally, the reaction may be performed by the simultaneous or subsequent application of an elevated temperature and/or in a reactive atmosphere.

Most preferably, the present invention relates to a method for the preparation of a patterned liquid crystal polymer (I), by patterning of the birefringence comprising the generation of a pattern in the degree of polymerization by single or multiple exposure of the polymerizable liquid crystal or polymerizable liquid crystal composition to radiation through one or more masks and/or to radiation in the form of a scanning beam under varying process conditions, preferably, varying temperature; and/or varying energy, preferably higher than 1 mJ/cm$^2$, more preferably in the range from 1 mJ/cm$^2$ to 5 J/cm$^2$, intensity or spectrum of the radiation used for exposing; and/or varying atmosphere.

Most preferably, the present invention relates to a method for the preparation of a patterned liquid crystal polymer (I), by patterning of the birefringence of the polymerizable applied composition (XXI) or the liquid crystalline polymer (I) by means of radiation.

Preferably the radiation used for the process denotes electromagnetic radiation in the visible and/or the UV and/or the x-ray range and/or particle radiation, like electrons and/or atoms and/or ions and/or molecules, most preferably UV radiation, whereby a locally variable radiation-induced physical or chemical reaction is initiated. The radiation-induced reaction alters the local birefringence. In a preferred embodiment of the invention, the radiation-induced reaction is accompanied by a change in the degree of polymerization.

In a further embodiment of the invention, one or more radiation-activable components within the polymerizable liquid crystal composition (XX) of the invention enable the adjustment of the birefringence of the liquid crystal composition depending on the local radiation treatment. Radiation activable components can for example be components which can transfer from one isomer form to one different isomer form (for example trans cis isomerization), depending on the local treatment with radiation. Preferably, the patterned radiation activation process is carried out before the polymerization of the liquid crystal composition. The radiation for the activation of the switching between different isomers can be applied through a black/white, gray or wavelength selective mask or by scanning of radiation beam over the area of the liquid crystal composition. Optionally, the effect of the radiation may be enhanced by simultaneous or subsequent thermal treatment or by storage of the liquid crystal composition in a specific atmosphere. The different isomers generated according to the local treatment with radiation influence the order within the liquid crystalline film in different ways and thus a local adjustment of the birefringence can be achieved. Preferably, the process of photo-isomerization is decoupled from the initiation of the polymerization process. The pattern of birefringence can be fixed by subsequent initiation of the polymerization of the liquid crystal composition.

Combinations of the above described approaches to pattern the birefringence are also conceivable.

Most preferably, the present invention relates to a method for the preparation of a patterned liquid crystal polymer (I), by using the means of photo-isomerization of the applied composition (XXI) of the invention that contain a photoisomerizable component by means of radiation.

Preferred photo-isomerizable compounds comprise N=N, C=C or C=N units.

Most preferably, the present invention relates to a method for the preparation of a patterned liquid crystal polymer (I), by patterning of the birefringence or of the thickness of a polymerizable liquid crystal (I) or of the polymerizable applied composition (XXI) of the invention.

This can be achieved by area selectively removing, preferably rinsing off or dissolving parts of an originally homogeneous film material.

Customarily, the unpolymerized parts are for example either removed by dipping the sample into a solvent or the polymerization is done at an elevated temperature whereby the subsequent polymerization can be initiated photochemically or/and thermally, preferably at a temperature exceeding the clearing temperature of the unpolymerized liquid crystal material. In both cases, a digital pattern of areas with higher and lower optical retardation is generated. In the former case, a thickness profile is formed due to the removal of the unpolymerized material, in the latter case a more or less homogeneous film is achieved which locally is birefringent or non-birefringent, or locally has higher or lower birefringence.

For example, in one embodiment a patterned degree of polymerization is generated according to the above description in a first step. In a second step, the liquid crystal composition with patterned degree of polymerization is developed by means of a suitable solvent, i.e. the film is rinsed with the solvent or dipped into the solvent. Since the solubility of the material and thus the removed material amount can depend on the degree of polymerization, it is consequently possible to transfer the pattern of polymerization degree into a pattern of the film thickness. The development process with the solvent may take place at an elevated temperature.

Suitable solvents for the development process are selected depending on the relative solubility of the components of the polymerizable applied composition (XXI) and of the cured liquid crystal film (I) and are for example acetone, anisole, butylacetate, butylmethacrylate, butylglycole (Butylcellosolve), gamma-butyrolactone, cyclohexanone, cyclopentanone, diethylenglycol-dietylether, diethylenglycole, diethylenglycol-dimethylether (Diglyme), N,N-dimethylformamide, dipropylenglycol-dimethylether, dipropylenglycol-monomethylether, dioxane, ethylacetate, ethyl lactate, ethylenglycol-diacetate, 2-ethoxyethyl acetate, ethyl-3-ethoxy-propionacid-ethylester, ethylenglycole, ethanol, 4-hydroxy-4-methyl-2-pentanone, isopropanole, 2-propanole, methylenehloride, methylethylketone, 4-methyl-2-pentanone, 1-methoxy-2-propanole, 1-methoxy-2-propanol acetate, methylpropylketone, 1-methyl-2-pyrrolidone, propylacetate, 2-pyrrolidone, propylenglycol-propylether, tetrahydrofuran, toluene, xylene.

Most preferably, the present invention relates to a method for the preparation of a patterned liquid crystal polymer (I), by area-selective removal of a polymerizable liquid crystal or a polymerizable liquid crystal composition, or components of the liquid crystal composition; and/or a liquid crystal polymer.

Especially most preferably, the present invention relates to a method for the preparation of a patterned liquid crystal polymer (I), comprising single or multiple exposure of the polymerizable liquid crystal film prepared from the applied composition (XXI) to radiation through one or more masks and/or to radiation in the form of a scanning beam at various process conditions,
and
subsequent developing by means of a solvent, and/or polymerising by elevated temperature.

A liquid crystal polymer (I) with a patterned degree of polymerization generated by the above described process can be also additionally patterned whereby patterned layer thickness is achieved by means of a homogeneous ablation of material by means of particle and/or electromagnetic radiation. The particle radiation may consist of ions, atoms, molecules and/or electrons, the electromagnetic radiation of IR, visible, UV light or x-rays.

In a further embodiment, the material ablation is done in a patterned way for a homogeneously polymerized liquid crystal polymer (I). The patterned ablation is achieved by inhomogeneous application of particle and/or electromagnetic radiation. The inhomogeneous application is achieved by means of a single or multi-step exposure of the birefringent liquid crystal composition through one or more black/white or gray or wavelength selective masks and/or by applying a scanned beam of radiation to the liquid crystal composition. The particle radiation may consist of atoms, molecules, ions and/or electrons, the electromagnetic radiation of IR, visible, UV light or x-rays.

A further method to generate a patterned film thickness is to area-selectively deposit the material onto a substrate. The deposition is preferably done by means of a printing process. Typical types of printing processes are ink-jet printing, spin coating, off-set printing, gravure printing, flexographic printing, etc.

A further method of the present invention for film thickness patterning is the application of an area-selective shaping process, like e.g. an embossing, stamping or molding process. The shaping process may be applied to the unpolymerized, the partially or the fully polymerized birefringent film.

An additional method to pattern the film thickness of birefringent films is the application of a lithography process. The lithography process may include the steps of applying a photoresist, a patterned exposure with radiation, a development step, an etching step and a stripping step. The lithography process is preferably applied to the partially or fully polymerized birefringent film.

For a patterning of the optical retardation, combinations of birefringence patterning and thickness patterning are also possible.

Especially most preferably, the present invention relates to a method for the preparation of a patterned liquid crystal polymer (I), by
a) single or multiple exposure of the polymerizable liquid crystal film prepared from the applied composition (XXI) to radiation through one or more masks and/or to radiation in the form of a scanning beam,
and
b) subsequent ablating an inhomogeneously cured liquid crystal film prepared from the applied composition (XXI) by means of homogeneous particle radiation and/or homogeneous electromagnetic radiation, preferably with a patterned irradiance.

Further, especially most preferably, the present invention relates to a method for the preparation of a patterned liquid crystal polymer (I), by
a) area selectively printing of the material area selective, and/or
b) area selective embossing, stamping or molding of the material, and/or
c) lithographing the material.

A further embodiment of the invention is a method comprising patterning of the optical axis of the liquid crystal polymer (I).

In case of photoalignment, the alignment function is induced to the alignment layer by visible and/or UV light, partially polarized, preferably partially linearly, circularly or elliptically polarized light by oblique or vertical exposure, or by unpolarized light by oblique exposure.

The patterning of the optical axis can be achieved by means of a patterned alignment layer subjacent to the liquid crystalline film. The alignment layer enables to induce a patterned azimuthal orientation of the optical axis to the liquid crystal film or a patterned tilt angle to the liquid crystal molecules at the interface between the alignment layer and the liquid crystal film. Depending on the type of alignment layer the alignment function can be induced by exposure to radiation, whereby the radiation can be electromagnetic radiation, particularly visible and/or UV light, or particle radiation, particularly atoms, molecules, ions and/or electrons. In addition, the alignment can be induced by a mechanical treatment of the alignment layer, e.g. rubbing of the layer, stretching of the layer and/or inducing submicron grooves into the layer. The function of substrate and alignment layer may be combined, i.e. depending on the type of substrate, the substrate itself can be functionalized to induce alignment to a liquid crystal film coated on top of the substrate. All above methods to induce the alignment function can also be applied directly to such suitable substrates.

A further way of patterning the optical axis orientation within a liquid crystal film (I) is the use of additives, preferably reactive additives, which depending on their characteristics influence the tilt profile and/or the azimuthal alignment profile. Such additives are for example additives which change their polarity, their pKa constant, their helical twisting power etc. upon activation of the conversion.

The activation of the conversion of the additive may take place upon exposure to radiation, preferably electromagnetic radiation, more preferably UV and/or visible light.

Activation by change of environment conditions like temperature and/or surrounding atmosphere also in combination with exposure to radiation is also possible.

Patterning can be achieved by area selectively polymerizing the zones under different activation conditions for the reactive additive within the formulation or by patterned activation of the conversion of the additive prior to polymerization.

Combinations of the above described methods to pattern the birefringence, the film thickness and the optical axis orientation are also possible.

Most preferably, the present invention relates to a method for the preparation of a patterned polymerized birefringent film, by an alignment layer.

Especially most preferably, the present invention relates to a method for the preparation of a patterned liquid crystal polymer (I), by patterning the liquid crystals with an alignment layer, which exhibits a tilt and/or an azimuthal orientation.

Especially most preferably, the present invention relates to a method for the preparation of a patterned liquid crystal polymer (I), and comprising liquid crystals and additives, preferably reactive additives; and/or chiral dopants.

In a preferred embodiment of the present invention, additives denote tilt and/or azimuthal orientation influencing additives and chiral dopants denotes chiral dopants, preferably with variable twisting power.

Especially most preferably, the present invention relates to a method for the preparation of a patterned polymerized liquid crystal polymer (I) by a combination of the above-given methods and or additives.

In the context of the present invention, a patterned irradiance denotes a locally varying incidence of radiation onto a target.

In the context of the present invention, an alignment layer denotes a layer with the function to induce alignment to a liquid crystal layer coated onto the alignment layer.

In the context of the present invention, a chiral dopant can be used as additive, preferably as reactive additive, that renders the polymerizable liquid crystal film thermochromic in the way that the pitch length and thereby the waveband reflected from that composition can be selected by temperature variation, i.e. the color that is reflected from the film is locally depending on the temperature at which the film was cured (as described for example in U.S. Pat. No. 6,117,920). The chiral dopant can be selected e.g. from the commercially available cholesteryl nonanoate (CN), CB15, R/S-811, R/S-1011, R/S-2011, R/S-3011 or R/S-4011 (Merck KGaA, Darmstadt) or Paliocolor® LC756, from BASF. Particularly suitable are dopants with high twisting power comprising a chiral sugar group, in particular dianhydrohexitol derivatives like for example derivatives of sorbitol, mannitol or iditol, very preferably sorbitol derivatives as disclosed in WO 98/00428, Further preferred are dopants comprising a hydrobenzoin group as described in GB 2,348,207, chiral binaphthyl derivatives as described in WO 02/94805, chiral binaphthol acetal derivatives as described in WO 02/34739, chiral TADDOL derivatives as described in WO 02/06265, and chiral dopants with at least one fluorinated linkage group and a terminal or central chiral group as described in WO 02/06196 and WO 02/06195, and chiral dopants as described in U.S. Pat. Nos. 5,250,222, 5,411,676, 5,093,027, 5,637,255, 5,230,828, 5,356,559, 5,360,577.

In the context of the present invention, the optical retardation is defined by the product of the birefringence and the thickness of the birefringent film. The birefringence is defined as the difference between the extra-ordinary and the ordinary index of refraction.

In the context of the present invention, the azimuthal alignment direction refers to the azimuthal orientation of the extraordinary axis in the plane of the layer. In addition, alignment profile means variation of the azimuthal and/or polar alignment direction along the thickness direction of the birefringent film as e.g. in a twisted retarder, In the context of the present invention tilt refers to the angle between the film plane and the orientation of the liquid crystal molecules, and a tilt profile indicates that the tilt angle varies along the film depth direction, where in some cases the tilt profile can be approximated by specifying an average tilt angle.

In the context of the present invention 'A plate' refers to an optical retarder utilizing a layer of uniaxial birefringent material with its extraordinary axis oriented parallel to the plane of the layer.

In the context of the present invention 'C plate' refers to an optical retarder utilizing a layer of uniaxial birefringent material with its extraordinary axis perpendicular to the plane of the layer.

In the context of the present invention 'O plate' refers to an optical retarder utilizing a layer of uniaxial birefringent material with its extraordinary axis oriented at an oblique angle with respect to the plane of the layer.

An A-, C- and O-plates comprising optically unaxial birefringent material with positive birefringence is also referred to as "+A/C/0 plate" or positive "positive A/C/0 plate". An A-, C- and O-plate comprising a film of optically uniaxial birefringent material with negative birefringence is also referred to as "−A/C/O plate" or "negative A/C/0 plate". In the context of the present invention the term "radiation curing" denotes a polymerization or crosslinking or process induced by radiation.

In a preferred embodiment of the present invention, a patterned liquid crystal polymer (I) is a three dimensional or two dimensions patterned liquid crystal polymer.

In addition, preferred is a patterned liquid crystal polymer, preferably one of formula (I), which is obtainable by the methods of the invention, especially which is obtainable by polymerization, preferably by photo-polymerization Preferably, the present invention relates to a patterned liquid crystal polymer (I) prepared from the applied composition (XXI).

Preferably, the present invention relates to a liquid crystal polymer (I), which has at least one laterally patterned property, whereby the pattern may be periodic or non-periodic.

"Laterally patterned" in the sense of the above definition means that a property of the birefringent film varies within the plane of the film.

The liquid crystal polymer (I) is also accessible by electron beam (EB). This curing method does not necessarily require an initiator.

Preferably, the present invention relates to an optical or electro-optical component, comprising a twisted retarder film, and/or a cholesteric liquid crystal film and/or a guest-host liquid crystal film and/or a smectic liquid crystal film, comprising a patterned liquid crystal polymer (I).

The birefringent film is resistant when exposed to light and temperature and can be used in the manufacture of devices such as security elements, compensation films, retardation films, filters, polarizers, optical gratings, waveguides, electro-optical cells, piezo-electrical cells or thin films exhibiting non-linear optical properties. Preferred are compensation and retardation films.

Further, preferably the present invention relates to twisted retarder films, comprising a patterned liquid crystal polymer (I) according to the invention.

Further, preferably the present invention relates to a cholesteric liquid crystal film, comprising a patterned liquid crystal polymer (I) according to the invention.

Preferably, the cholesteric liquid crystal film is a twisted a-plate showing a wavelength and polarization selective reflection of light, whereby the wavelength band of the reflected light depends on the pitch or pitch gradient along the thickness direction and on the birefringent properties of the liquid crystal polymer (I).

Further, preferably the present invention relates to a guest-host liquid crystal film, comprising a patterned liquid crystal polymer (I) according to the invention.

Preferably, the guest-host liquid crystal film includes additional anisotropically absorbing molecules, which preferably substantially align parallel to the director of the liquid crystal.

Preferably, anisotropically absorbing molecules exhibit different absorption properties for different polarization states of light typically in a wavelength range of about from 150 to 2000 nm.

The anisotropically absorbing molecules typically used have carbon-carbon, carbon-nitrogen, or nitrogen-nitrogen double bonds.

The anisotropically absorbing molecules are for example azo dyes, anthraquinone, mericyanine, methane, 2-phenylazothiazole, 2-phenylazobenzthiazole, stilbene, 1,4-bis(2-phenylethylenyl)benzene, 4,4'-bis(arylazo)stilbenes, perylene, 4,8-diamino-1,5-naphthoquinone dyes, diaryl ketones, having a ketone moiety or ketone derivative in conjugation with two aromatic rings, such as for example substituted benzophenones, benzophenone imines, phenylhydrazones, and semicarbazones or cinnamates. Preparation of the anisotropically absorbing materials listed above are well known as shown, e.g. by Hoffman et al., U.S. Pat. No. 4,565, 424, Jones et al., in U.S. Pat. No. 4,401,369, Cole, Jr. et al., in U.S. Pat. No. 4,122,027, Etzbach et al., in U.S. Pat. No. 4,667,020, and Shannon et al., in U.S. Pat. No. 5,389,285.

Preferred anisotropically absorbing molecules are arylazo, anthraquione, poly(arylazo), stilbene and diaryl ketone derivatives and cinnamates.

More preferred are arylazo, stilbene, diaryl ketone and cinnamate.

The anisotropically absorbing molecules can be covalently bonded within a main chain polymer, they can be covalently bonded as side chain groups to a main chain or they can be present as non bonded solutes in a polymer.

Polymers denotes for example to polyacrylate, polymethacrylate, polyimide, polyamic acids, polymaleinimide, poly-2-chloroacrylate, poly-2-phenylacrylate; unsubstituted or with $C_1$-$C_6$alkyl substituted poylacrylamide, polymethacrylamide, poly-2-chloroacrylamide, poly-2-phenylacrylamide, polyvinylether, polyvinylester, polystyrene-derivatives, polysiloxane, stright-chain or branched alkyl esters of polyacrylic or polymethacrylic acids; polyphenoxyalkylacrylates, polyphenoxyalkylmethacrylates, polyphenylalkylmathacrylates, with alkyl residues of 1-20 carbon atoms; polyacrylnitril, polymethacrylnitril, polystyrene, poly-4-methylstyrene or mixtures thereof.

Preferably, the present invention relates also to the use of unpatterned or patterned optical or electro-optical component according to the invention as retardation film and/or compensation film and/or reflectively polarizing film and/or absorptively polarizing film and/or anisotropically scattering film for (a) twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, in-plane switching (IPS) liquid crystal displays, fringe field switching (FFS) liquid crystal displays, vertically aligned (VA) liquid crystal displays; all above display types are applied in either transmissive or reflective or transflective mode;

(b) displays generating three dimensional images or images varying with viewing angle;

(c) security or brand protection devices;

(d) decorative optical devices;

(e) brightness enhancement films;

(f) optical sensors;

(e) light-based telecommunication devices.

Further, preferably the present invention relates to a monomer corrugated film.

Further, preferably the present invention relates to a smectic liquid crystal film comprising the liquid crystal polymer (I).

Smectic liquid crystal film denotes to liquid crystalline film which is polymerized in the smectic phase, where the liquid crystal molecules in a smectic phase have in addition to the orientational order a degree of positional order along one direction Further, preferably the present invention relates to stacks of above given devices.

A further embodiment of the present invention relates to devices comprising an optical or electro-optical component, preferably compensation and retardation films (viewing angle, color shift, contrast, gray level stability, brightness) for:

security element wavelength-band-selective compensation: birefringent compensation film which is patterned according to the RGB, red, green and blue, subpixels of the liquid crystal display to provide compensation properties optimally adapted to the respective wavelength band transmitted by the subpixel, multi-domain (e.g. transflective liquid crystal displays) compensation: birefringent compensation film with patterned properties according to the laterally varying properties of the device to be compensated, component of multiview liquid crystal displays: compensation or retardation film as a component of a display providing different images for different viewing angles, component of three dimension liquid crystal displays: compensation or retardation film used as a component of a liquid crystal display providing three dimensional image information, achromatic retarder: retarder film which in contrast to a simple chromatic retarder provides for a similar change in polarization state for a broader wavelength band, e.g. the whole visible wavelength spectrum, polarization state correction/adjustment films: birefringent films which are used to correct or adjust the polarization state with the goal to enable the function or improve the performance of an optical device,
component of optical or electro-optical sensors, in particular polarization sensitive/selective sensors,
component of brightness enhancement film,
security devices or decorative optical devices,
components for light-based telecommunication devices, in particular devices based on polarized light.

A further embodiment of the present invention relates to devices comprising a patterned G/H-polarizer with an anisotropic absorber.

Preferably the patterned G/H-polarizer with an anisotropic absorber is a thin film polarizer, in-cell polarizer, a security device or a decorative optical device.

A further embodiment of the present invention relates to devices comprising a patterned reflective circular polarizer.

Preferably the patterned reflective circular polarizer is a brightness enhancement film, a security device or a decorative optical device.

A further embodiment of the present invention relates to devices comprising a patterned reflective linear polarizer.

Preferably the patterned reflective linear polarizer is a brightness enhancement film, a security device or a decorative optical device.

A further embodiment of the present invention relates to a beam steering device, which comprises an optical or electro-optical component, preferably compensation and retardation films for wavefront adjustment devices.

A further embodiment of the present invention relates to devices comprising a patterned MC, monomer corrugated, film.

Preferably the patterned monomer corrugated film is an anisotropically scattering film, an anisotropic reflector, an anti-reflection film, a film with enhanced birefringence, a security device or a decorative optical device.

Especially preferred are in the present invention devices such as for example twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, in-plane switching (IPS) liquid crystal displays, fringe field switching (FFS) liquid crystal displays, vertically aligned (VA) liquid crystal displays; all above display types are applied in either transmissive or reflective or transflective mode, which can be used for displays generating three dimensional images or images varying with viewing angle; beam steering device; a light-based telecommunication device; optical sensor; stacks of devices.

In the present invention novel patternable liquid crystal formulations were found which give by way of a simple process access for patterning of optical properties to two or more different retardation values. This easy accessibility is very useful for various applications.

It turns out that because of the very limited process windows for exposure doses and temperatures with standard acrylate LCP, the retardation patterning process is considerably more difficult than with the air-curable LCP materials including a component with a thiol or thio-ether unit described in this invention. Only compromises between solubility contrast (development process) or retardation contrast (process with second polymerization above clearing point) and the resolution of the pattern can be adjusted. The major advantage of air-curable LCP mixtures regarding patterning is the possibility to adjust a well-defined transition between polymerized and non-polymerized zones in an LCP film using exposure doses leading to reasonable degrees of polymerization.

EXAMPLES wt % percent per weight
LPP linear photopolymerizable polymer
LCP liquid crystal polymer
LC liquid crystal
min minutes
rpm revolutions per minute
FTIR Fourier Transform Infrared
IR infrared
$T_{AN}$ annealing temperature
$T_c$ clearing temperature
CP cyclopentanone
MIBK methyl isobutyl ketone
CHN cyclohexanone
AN anisole
LCP (1) 2,5-bis-[4-6-acryloyloxyhexyloxy)benzoyloxy]benzoic acid pentyl ester commercially available from ROLIC Technologies, Switzerland or prepared in analogy to Schemes 1, 2, 3, 4 of U.S. Pat. No. 5,593,617
LCP (2) has the meaning of a liquid crystal compound of the following formula

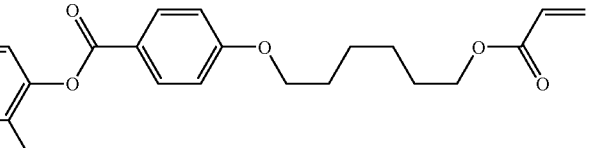

LCP (2) is accessible by preparation methods well known in the art to a skilled person. Preferably LCP (2) is accessible by methods described in WO 95/24454, examples.

LCP (3) has the meaning of a liquid crystal compound of the following formula

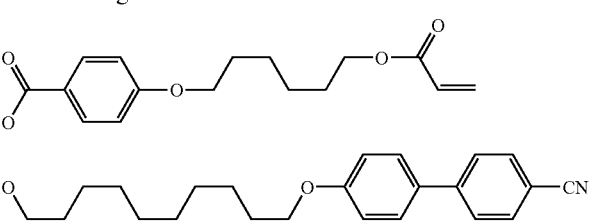

LCP (3) is accessible by preparation methods well known in the art to a skilled person. Preferably LCP (3) is accessible by methods described in WO 00/55110, schemes 1 and 2 and examples.

LPP has the meaning of "linearly photopolymerizable polymer". For the production of an LPP alignment layer, suitable LPP materials are described for example in patent publications EP 0 611 786, WO 96/10049 and EP 0 763 552, and include cinnamic acid derivatives and ferulic acid derivatives. For example, the following LPP material ROP-103 is chosen.

ROP-103 is a commercially available photo-alignment material (ROLIC Technologies, Switzerland). This photo-alignment polymer is based on cinnamate as photo-reactive groups. The polymer backbone of the photo-alignment material is of acrylate type.

Example 1

Composition M1

A polymerizable composition M1 is prepared as follows:

| Compound | Weight (%) |
|---|---|
| LCP(1) | 91.4 |
| Pentaerythritol tetrakis(3-mercaptopropionate) | 5.0 |
| Irgacure ® 369, photoinitiator, 2-benzyl-2-dimethylamino-1(4-morpholinophenyl)-butanone-1 from CIBA Specialty Chemicals Inc. | 3.0 |
| Tinuvin ® 123, bis(1-octyloxy-2,2,6-tetramethyl-4-piperidyl) sebacate from CIBA Specialty Chemicals Inc. | 0.5 |
| Hydrochinon-monomethylether, from Aldrich | 0.1 |

Composition M1/Air curing

A solution of the composition M1 in cyclopentanone, 30 wt %, is stirred for 30 minutes at room temperature.

Preparation of the Alignment Layer

For the spin-coating of the alignment layer onto the substrate, ROP-103 was dissolved in cyclopentanone at a solid concentration of 2 weight percent. The LPP solution is stirred for 30 minutes at room temperature.

The substrate (glass substrate) is spin-coated with the LPP solution (1 min at 2000 rpm). After drying at 180° C. for 10 min, the sample is illuminated with polarized light from a high pressure Hg arc-lamp with filters (e.g. 100 mJ/cm$^2$, with Schott UG11 and WG 295) to select the spectral range of 300 to 330 nm.

The solution of mixture M1 is then deposited by spincoating onto this LPP-coated substrate and annealed at 39° C. for 2 min. The clearing temperature for M1 is 44° C. The thin film is subsequently photopolymerized with non polarized UVA-light under air (500 mJ/cm$^2$, lamp intensity=50 mW/cm$^2$, time=10 s) at room temperature to give a polymerized tack-free LC film (thickness=2.44 µm). Finger tack is tested by touching the specimen being tested with an index finger and noting how tacky (i.e., sticky) the specimen feels. The film might be called tack-free (dry to the touch), through not necessarily fully cured.

To characterize the alignment performances of the liquid crystal materials, the contrast of the cross-linked liquid crystal layer is measured using a polarizing microscope with crossed polarizers, which was further equipped with a photodiode for light intensity measurements. The contrast is calculated as the ratio of the light intensities measured with the optical axis of the cross-linked liquid crystal layer oriented 45° and 0° in respect to one of the polarizers. The high contrast of 4000:1 demonstrates the excellent alignment performances of M 1.

The chemical conversion is determined for the ene moiety using FTIR (ATI Mattson Genesis Series FTIR Spectrometer). A 2.65 µm-thick layer of the reactive composition is spin-coated on silicon plates. The thicknesses of the films are finally measured with Tencor alpha-stepper 500. The infrared spectrum of the film is measured before and after cure. The band at 810 cm$^{-1}$ (corresponding to the C=C—H deformation peak) is less affected by overlap with other bands and is thus selected for the measurement of the conversion rate. The equation for calculating the degree of conversion for the unsaturated carbon-carbon-bonds is as follows: Conversion (%)=$(A_0-A_t)/A_0$ where $A_0$ and $A_t$ represent the IR band at 810 cm$^{-1}$ before and after UV exposure (500 mJ/cm$^2$).

The 810 cm$^{-1}$ band is normalized to the 1510 cm$^{-1}$ band ($v(1,4-C_6H_4)$ aromatic band) as an internal standard.

The conversion degree for the unsaturated carbon-carbon-bonds was 68%.

Comparative Example 1

Composition C1

A polymerizable liquid crystal composition C1 is prepared as follows:

| Compound | Weight (%) |
|---|---|
| LCP (1) | 96.4 |
| Irgacure 369 ®, 2-benzyl-2-dimethylamino-1(4-morpholinophenyl)-butanone-1, from CIBA Specialty Chemicals Inc. | 3.0 |
| Tinuvin 123 ®, bis(1-octyloxy-2,2,6-tetramethyl-4-piperidyl) sebacate, from CIBA Specialty Chemicals Inc. | 0.5 |
| Hydrochinon-monomethylether, from Aldrich | 0.1 |

Composition Ca-M1/Without thiol/Air curing

The coating is performed in a similar manner as described for example 1. LC annealing is performed at 50° C. for 2 min. The clearing temperature for Ca-M1 is 55° C. The thin film is subsequently photopolymerized with isotropic UVA-light under air (500 mJ/cm$^2$, lamp intensity=50 mW/cm$^2$, time=10 s) at room temperature to lead to a tacky film. The conversion degree for the ene moiety is very low (42%).

Comparative Example 2

Composition C2

A polymerizable liquid crystal composition C2 is prepared as follows:

| Composition Cb-M1/Air curing | |
|---|---|
| Compound | Weight (%) |
| LCP (1) | 92.9 |
| Pentaerythritol tetrakis(3-mercaptopropionate) From Aldrich | 5.0 |

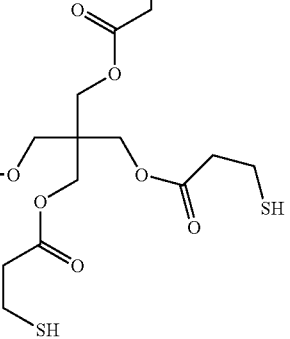

| | |
|---|---|
| Irgacure ® 369, 2-benzyl-2-dimethylamino-1(4-morpholinophenyl)-butanone-1, from CIBA Specialty Chemicals Inc. | 1.0 |
| Tinuvin ® 123, bis(1-octyloxy-2,2,6-tetramethyl-4-piperidy sebacate, from CIBA Specialty Chemicals Inc. | 1.0 |
| Hydrochinon-monomethylether, from Aldrich | 0.1 |

The coating is performed in a similar manner as described for example 1. LC annealing is performed at 43° C. for 2 min. The clearing temperature for Ca-M1 is 47° C. The thin film is subsequently photopolymerized with isotropic UVA-light under air (500 mJ/cm², lamp intensity=50 mW/cm², time=10 s) at room temperature to lead to a tacky film. The conversion degree for the ene moiety is quite low (41%).

This example emphasizes the critical influence of the photoinitiator concentration in the air curing performances.

Comparative Example 3

Composition C1

The coating of C1 is performed in a similar manner as described in example 1. LC annealing is performed at 50° C. for 2 min. The clearing temperature for M1 is 55° C. The thin film is subsequently photopolymerized with isotropic UVA-light under nitrogen (500 mJ/cm², lamp intensity=50 mW/cm², time=10 s) to give a polymerized tack-free LC film (thickness=2.57 μm). The conversion degree for the ene moiety is 70%.

Comparative Example 4

Composition M1

The coating of M1 is performed in a similar manner as described in example 1. LC annealing is performed at 39° C. for 2 min. The thin film is subsequently photopolymerized with isotropic UVA-light under nitrogen (500 mJ/cm², lamp intensity=50 mW/cm², time=10 s) to give a polymerized tack-free LC film (thickness=2.44 μm). The conversion degree for the ene moiety is 79%.

Example 5

Composition M2

A polymerizable liquid crystal mixture M2 is prepared as follows:

| Mixture Cb-M1/Air curing | |
|---|---|
| Compound | Weight (%) |
| LCP (1) | 88.4 |
| Pentaerythritol tetrakis(3-mercaptopropionate), from Aldrich | 5.0 |

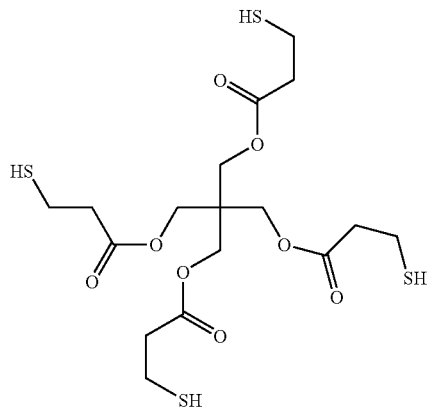 [SMILES: O=C(CCS)OCC(COC(=O)CCS)(COC(=O)CCS)COC(=O)CCS]

-continued

Mixture Cb-M1/Air curing

| Compound | Weight (%) |
|---|---|
| Dipentaerythritol pentaacrylate, | 3.0 |

| | |
|---|---|
| Irgacure ® 369, 2-benzyl-2-dimethylamino-1(4-morpholinophenyl) butanone-1, from CIBA Specialty Chemicals Inc. | 3.0 |
| Tinuvin ® 123, bis(1-octyloxy-2,2,6-tetramethyl-4-piperidyl) sebacate, from CIBA Specialty Chemicals Inc. | 0.5 |
| Hydrochinon-monomethylether, from Aldrich | 0.1 |

The coating is performed in a similar manner as described for example M1. LC annealing is performed at 30° C. for 2 min. The clearing temperature for M3 is 33° C. The thin film is subsequently photopolymerized with isotropic UVA-light under air (500 mJ/cm², lamp intensity=50 mW/cm², time=10 s) at room temperature to lead to a tack-free LC film (thickness=2.45 μm). The conversion degree for the ene moiety was 62%. This example illustrates the use of reactive additives (here dipentaerythritol pentaacrylate) which participate to the formation of the network.

Example 6

Influence of the Thiol Structure and Concentration

Preparation of the Films

The following application conditions are used except otherwise mentioned. For the spin-coating of the alignment layer onto the substrate the ROP-103 was dissolved in cyclopentanone at a solid concentration of 2 weight percent. The LPP solution is stirred for 30 minutes at room temperature.

The substrates (glass substrate) are spin-coated with the LPP solution (1 min at 2000 rpm). After drying at 180° C. for 10 min, the samples are illuminated with polarized light from a high pressure Hg arc-lamp with filters (e.g. 100 mJ/cm², spectral range of 300 to 330 nm).

For the next results, the LCP formulation was as follows except otherwise mentioned Concentration of 20% in cyclohexanone

LCP(1) (47.70%); LCP: (3) (48.30%),

Irgacure ® 651 (3.00%), photoinitiator from CIBA Specialty Chemicals Inc.

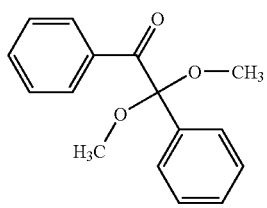

Tinuvin ® 123 (0.50%) from CIBA Specialty Chemicals Inc.

-continued

Concentration of 20% in cyclohexanone

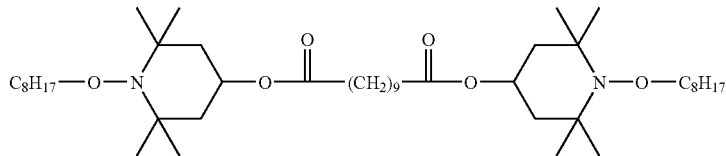

Tego ® Wet 500 (0.40%), non-ionic organic surfactant from TEGO
Hydrochinon-monomethylether (0.10%) from Aldrich
Thiol according to table (I)

The solution is stirred for 30 minutes at room temperature, is deposited by spincoating (from 2500 rpm to 3000 rpm for 1 min; average thickness ca 1.20 μm) onto this LPP-coated substrate and annealed at $T_{AN}$ (annealing temperature) for 2 min. The clearing temperature for the mixture is $T_c$ (given in the table). The thin film is subsequently photopolymerized with non polarized UVA-light under air (500 or 1000 mJ/cm², lamp intensity=60 mW/cm²) at room temperature to give a polymerized LC film. Finger tack is tested by touching the specimen being tested with an index finger and noting how tacky (i.e., sticky) the specimen feels. The alignment performances and chemical conversions are determined as described previously.

| Legend to table (I) | | |
|---|---|---|
| | % | Weight ratio (%) |
| | P | Polythiol (wgt %) |
| | A | Air-curability |
| | Al.p. | Alignment performances |
| | ✓ | Air curable |
| | 0 | Not air curable |
| | ++ | Very good alignment |
| | + | Low alignment performances |
| | 0 | No alignment |
| | (max) | Maximum of thiol |
| | (min) | Minimum of thiol |

TABLE (I)

| Thiol | (%) (3)/(1) | P | $T_c$ (° C.) ($T_{AN}$) | A | Al.p. |
|---|---|---|---|---|---|
| Trimethylolpropane tris(3-mercaptopropionate) | 42.01/41.49 | 12.50 (max) | 54 (45) | ✓ | + |
| | 44.93/44.38 | 6.69 | 61 (54) | ✓ | ++ |
| | 46/45.43 | 4.57 | 63 (58) | ✓ | ++ |
| | 46.56/45.98 | 3.46 | 66 (62) | ✓ | ++ |
| | 47.12/46.54 | 2.34 | 69 (64) | ✓ | ++ |
| | 47.58/47 | 1.42 | 68 (63) | ✓ | ++ |
| | 47.71/47.11 | 1.18 (min) | 72 (67) | ✓ | ++ |
| Pentaerythritol tetrakis(3-mercaptopropionate) from Aldrich | 42.45/41.93 | 11.62 (max) | 59 (50) | ✓ | + |
| | 45.19/44.63 | 6.18 | 63 (57) | ✓ | ++ |
| | 46.185/45.6 | 4.20 | 65 (60) | ✓ | ++ |
| | 46.69/46.11 | 3.20 | 68 (63) | ✓ | ++ |
| | 47.22/46.63 | 2.15 | 71 (65) | ✓ | ++ |
| | 47.64/47.05 | 1.32 | 69 (65) | ✓ | ++ |
| | 47.75/47.16 | 1.09 (mim) | 72 (67) | ✓ | ++ |
| | | | | | + |

TABLE (I)-continued

| Thiol | (%) (3)/(1) | P | $T_c$ (° C.) ($T_{AN}$) | A | Al.p. |
|---|---|---|---|---|---|
| 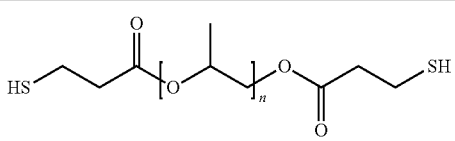  Polypropyleneglycol-3-mercaptopropionate 2200 | 34.17/33.74 | 28.09 (max) | 53 (45) | ✓ | + |
| | 40.03/39.54 | 16.43 | 58 (50) | ✓ | + |
| | 44.09/43.54 | 8.37 | 61 (55) | ✓ | + |
| | 46.02/45.44 | | | | |
| | 46.75/46.17 | 4.54 | 65 (50) | ✓ | + |
| | 47.51/46.92 | | | | |
| | | 3.08 (min) | 68 (55) | ✓ | ++ |
| | | 1.56 | 73 (68) | 0 | ++ |
| 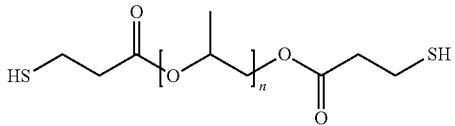  Polypropyleneglycol-3-mercaptopropionate 800 | 41.98/41.46 | 12.56 (max) | 70 (55) | ✓ | + |
| | 44.92/44.37 | 6.71 | 70 (60) | ✓ | + |
| | 46.68/46.10 | 3.22 (min) | 66 (60) | ✓ | ++ |
| 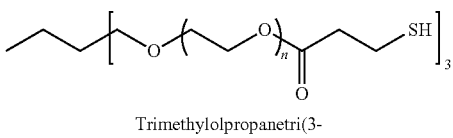  Trimethylolpropanetri(3-mercaptopropionate) 1300 | 41.53/41.01 | 13.45 (max) | 76 (60) | ✓ | + |
| | 43.04/42.51 | 10.44 | 77 (55) | ✓ | + |
| | 46.55/45.97 | 3.48 | 66 (60) | ✓ | + |
| | 47.37/46.78 | 1.84 (min) | 67 (61) | ✓ | ++ |
| 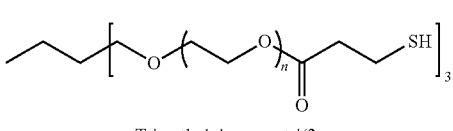  Trimethylolpropanetri(3-mercaptopropionate) 700 | 44.41/43.85 | 7.74 | 55 | ✓ | 0 |
| | 45.32/44.76 | 5.92 (max) | 60 (45) | ✓ | + |
| | 46.27/45.69 | 4.04 | 64 (59) | ✓ | ++ |
| | 47.34/46.75 | 1.91 | 68 (63) | ✓ | ++ |
| | 47.8/47.2 | 1.00 (min) | 73 (67) | ✓ | ++ |
| | | | 72 (67) | ✓ | ++ |
| 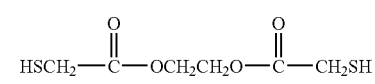  Ethylene glycol bisthioglycolate | 46.46/45.88 | 3.66 | 72 (67) | ✓ | ++ |
| 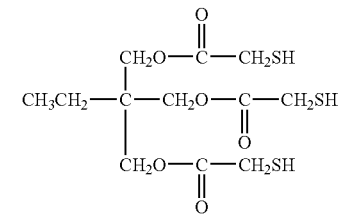  Trimethylolpropane tris(2-mercaptoacetate) | 40.98/40.47 | 14.55 | 55 | ✓ | 0 |
| | 42.59/42.07 | 11.34 (max) | 56 (48) | ✓ | ++ |
| | 45.26/44.71 | 6.03 | 60 (55) | ✓ | ++ |
| | 46.23/45.66 | 4.11 | 64 (60) | ✓ | ++ |
| | 46.74/46.16 | 3.10 | 66 (62) | ✓ | ++ |
| | 47.25/46.66 | 2.09 | 69 (64) | ✓ | ++ |
| | 47.66/47.07 | 1.27 | 70 (65) | ✓ | ++ |
| | 47.81/47.21 | 0.98 (min) | 73 (68) | ✓ | ++ |

TABLE (I)-continued

| Thiol | (%) (3)/(1) | P | $T_c$ (°C) ($T_{AN}$) | A | Al.p. |
|---|---|---|---|---|---|
| Pentaerythritol trakis(2-mercaptoacetate) from Aldrich<br/>HSCH₂—C(=O)—OCH₂—C(CH₂O—C(=O)—CH₂SH)(CH₂O—C(=O)—CH₂SH)—CH₂O—C(=O)—CH₂SH | 41.55/41.03 | 13.42 (max) | 63 (45) | ✓ | + |
| | 43.05/42.52 | 10.43 | 60 (53) | ✓ | ++ |
| | 45.51/44.96 | 5.53 | 63 (58) | ✓ | ++ |
| | 46.41/45.84 | 3.75 | 66 (62) | ✓ | ++ |
| | 46.87/46.29 | 2.84 | 68 (64) | ✓ | ++ |
| | 47.34/46.75 | 1.91 | 71 (66) | ✓ | ++ |
| | 47.72/47.12 | 1.16 | 71 (67) | ✓ | ++ |
| | 47.85/47.26 | 0.89 (min) | 73 (68) | ✓ | ++ |
| Ethyl 2-mercaptoacetate from Aldrich<br/>HSCH₂—C(=O)—OCH₂CH₃ | 38.69/38.21 +15.62 triacrylate tris(2-hydroxyethyl) isocyanurate | 3.48 | 55 | ✓ | 0 |
| | 44.29/43.74 +6.98 triacrylate tris(2-hydroxyethyl)isocyanurate | 0.99 (min) | 59 (54) | ✓ | ++ |

Example 7

Influence of Additives on the Curing Performances

Preparation of the Films

For the spin-coating of the alignment layer onto the substrate the ROP-103 was dissolved in cyclopentanone at a solid concentration of 2 weight percent. The LPP solution is stirred for 30 minutes at room temperature.

The substrates (glass substrate) are spin-coated with the LPP solution (1 min at 2000 rpm). After drying at 180° C. for 10 min, the samples are illuminated with polarized light from a high pressure Hg arc-lamp with filters (e.g. 100 mJ/cm², spectral range of 300 to 330 nm).

The LCP formulation is as follows except otherwise mentioned

| Concentration of 20 wt % in cyclohexanone (CHN) |
|---|
| LCP (3) (46.18%) |
| LCP (1) (15.60%) |
| Pentaerythritol tetrakis(3-mercaptopropionate) (4.22%) from Aldrich |
| Irgacure ® 651 (3.00%) from CIBA Specialty Chemicals Inc. |
| 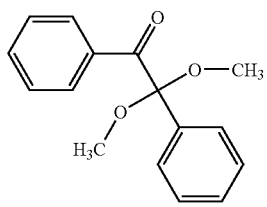 [SMILES: COC(OC)(C(=O)c1ccccc1)c1ccccc1] |
| Tinuvin ® 123 (0.50%) from CIBA Specialty Chemicals Inc. |
| 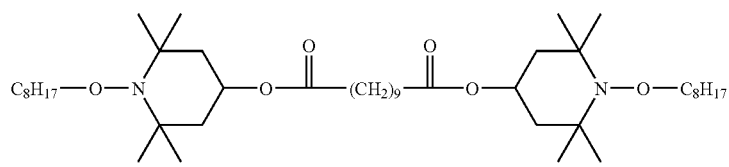 |
| Tego ® Wet 500 (0.40%), non-ionic organic surfactant from TEGO |
| Hydrochinon-monomethylether (0.10%) from Aldrich |

The solution is stirred for 30 minutes at room temperature, was deposited by spincoating (from 2000 rpm to 3000 rpm for 1 min; average thickness ca 1.20 μm) onto this LPP-coated substrate and annealed at $T_{AN}$ (annealing temperature) for 2 min. The clearing temperature for the mixture is $T_c$ (given in the table). The thin film is subsequently photopolymerized with non polarized UVA-light under air (500 or 1000 mJ/cm², lamp intensity=60 mW/cm²) at room temperature to give a polymerized LC film. Finger tack is tested by touching the specimen being tested with an index finger and noting how tacky (i.e., sticky) the specimen feels. The alignment performances and chemical conversions are determined as described previously.

| Legend | % Comp. | Additive Weight % (3)/(1)/Pentaerythritol tetrakis(3-mercapto-propionate) (%) |
|---|---|---|
| | A | Air-curability |
| | Al.p. | Alignment performances |

| Name Structure | % | comp. | $T_c$ ($T_{AN}$) | A | Al. p. |
|---|---|---|---|---|---|
| Isobornyl Acrylate from Aldrich | 3.0 | 44.74/44.18/4.08 | 65 (59) | ✓ | ++ |
|  | 3.0 | 44.6/44.04/4.36 | 64 (58) | ✓ | ++ |
|  | 3.0 | 44.46/43.90/4.64 | 63 (56) | ✓ | ++ |
|  | 5.0 | 43.54/42.99/4.46 | 62 (56) | ✓ | ++ |
| Ethoxylated (4) Biphenol A Diacrylate | 3.0 | 44.63/44.06/4.31 | 55 (49) | ✓ | + |
|  | 5.0 | 43.59/43.04/4.38 | 55 | ✓ | +− |
| Tris(2-HydroxyEthyl) Isocyanurate Tricrylate | 3.0 | 44.53/43.97/4.50 | 57 (52) | ✓ | ++ |
|  | 5.0 | 43.43/42.88/4.69 | 54 (45) | ✓ | + |
| Esterdiol Acrylate | 3.0 | 44.74/44.18/4.08 | 58 (52) | ✓ | ++ |
|  | 5.0 | 43.78/43.23/4.0 | 54 (49) | ✓ | ++ |
| Aliphatic Urethane Tetraacrylate | 2.0 | 45.14/44.57/4.28 | 60 (55) | ✓ | + |
|  | 3.0 | 44.62/44.06/4.32 | 58 (50) | ✓ | + |
| Aromatic Urethane Tetraacrylate | 1.0 | 45.66/45.08/4.26 | 62 (57) | ✓ | ++ |
|  | 3.0 | 44.61/44.05/4.34 | 60 (45) | ✓ | + |

-continued
| Name Structure | % | comp. | $T_c$ ($T_{AN}$) | Al. A | p. |
|---|---|---|---|---|---|
| 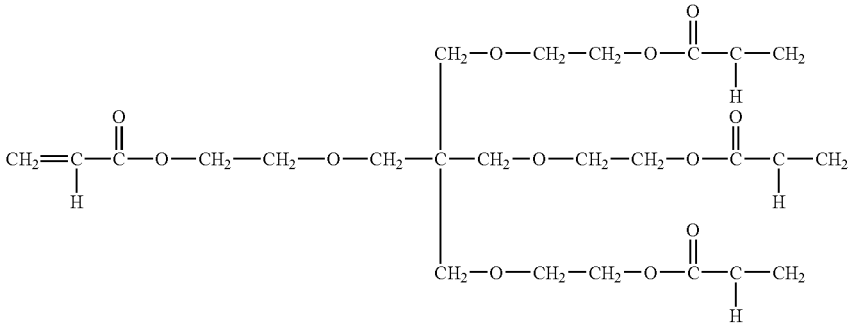  Ethoxylated (3) Pentaerythritol Tetraacrylate SR494 | 3.0 | 44.51/43.96/4.53 | 59 (45) | ✓ | + |
| 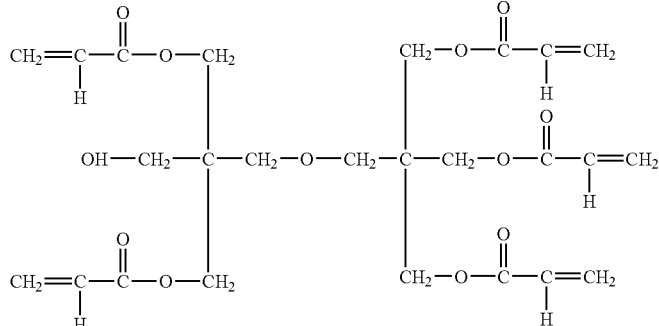  Dipentaerythritol pentaacrylate SR399 | 3.0 | 44.46/43.90/4.64 | 63 (45) | ✓ | + |
| 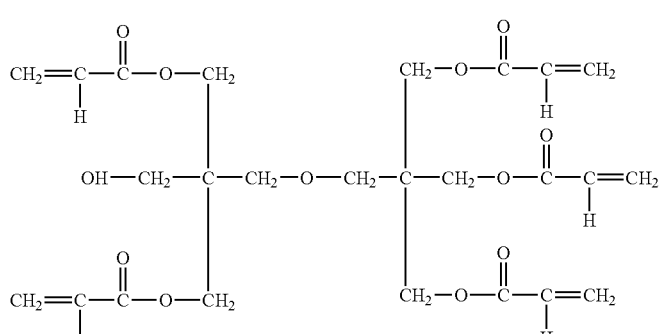  Low Viscosity Dipentaerythritol pentaacrylate SR399 LV | 3.0 | 44.46/43.90/4.64 | 62 (45) | ✓ | + |
| 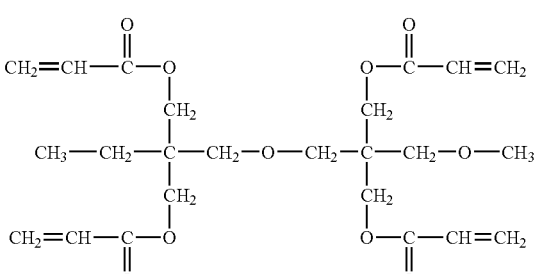  Di-Trimethylolpropane tetraacrylate SR-355 | 3.0 | 44.50/43.93/4.57 | 56 (52) | ✓ | ++ |

-continued

| Name Structure | % | comp. | $T_c$ ($T_{AN}$) | A | Al. p. |
|---|---|---|---|---|---|
| Pentaerythritol Tetraacrylate SR-295 | 3.0 | 44.40/43.85/4.75 | 60 (45) | ✓ | + |
| 1,6-Hexanediol Dimethacrylate SR-239 A | 3.0 | 44.40/43.83/4.77 | 58 (53) | ✓ | ++ |
| Tetrahydrofurfuryl acrylate® SR-285 | 3.0 | 44.55/43.99/4.46 | 62 (57) | ✓ | ++ |
| Glyoxal bis(diallyl acetal) | 2.0 | 44.61/44.04/5.35 | 59 (54) | ✓ | ++ |
| Pentaerythritol allyl ether | 2.0 | 43.85/43.29/6.86 | 54 (45) | ✓ | + |
| Trimethylolpropane diallyl | 2.0 | 44.12/43.57/6.31 | 58 (53) | ✓ | ++ |
| Poly(ethylene glycol) divinyl ether $H_2C=CH(OCH_2CH_2)nOCH=CH_2$ | 2.0 | 44.25/43.68/6.07 | 58 (50) | ✓ | + |
| Tris[4-(vinyloxy)butyl] trimellitate | 2.0 | 44.52/43.96/5.52 | 59 (50) | ✓ | + |

-continued

| Name Structure | % | comp. | $T_c$ ($T_{AN}$) | A | Al. p. |
|---|---|---|---|---|---|
| Tri(ethylene glycol) divinyl ether In addition, a crosslinkable triacrylate additive is added to the composition. | 2.0 | 44.06/43.50/6.44 | 60 (50) | ✓ | + |
| 2-(N-Ethylperfluorosulfonamide) ethyl acrylate | 0.5 | 45.95/45.36/4.19 | 67 (61) | ✓ | ++ |
| In addition, a crosslinkable triacrylate additive is added to the composition. | 3.0 | 44.74/44.18/4.08 | 62 (55) | ✓ | ++ |

Example 8

Influence of the LCP "ene" Moiety and Functionality on the Curing Performances Preparation of the Films For the spin-coating of the alignment layer onto the substrate the ROP-103 was dissolved in cyclopentanone at a solid concentration of 2 weight percent. The LPP solution is stirred for 30 minutes at room temperature.

The substrates (glass substrate) are spin-coated with the LPP solution (1 min at 2000 rpm). After drying at 180° C. for 10 min, the samples are illuminated with polarized light from a high pressure Hg arc-lamp with filters (e.g. 100 mJ/cm$^2$, spectral range of 300 to 330 nm).

For the next results, the LCP formulation is as follows except otherwise mentioned The solution is stirred for 30 minutes at room temperature, was deposited by spincoating (from 2500 rpm to 3000 rpm for 1 min; average thickness ca 1.20 μm) onto this LPP-coated substrate and annealed at $T_{AN}$ (annealing temperature) for 2 min. The clearing temperature for the mixture is $T_c$ (given in the table). The thin film is subsequently photopolymerized with non polarized UVA-light under air (500 or 1000 mJ/cm$^2$, lamp intensity=60 mW/cm$^2$) at room temperature to give a polymerized LC film. Finger tack is tested by touching the specimen being tested with an index finger and noting how tacky (i.e., sticky) the specimen feels. The alignment performances and chemical conversions are determined as described previously.

| Legend | | |
|---|---|---|
| | A | Air curable |
| | Al.p. | Alignment performance |
| | P | Polythiol (wgt %) |
| | ✓ | Air curable |
| | 0 | Not air curable |
| | ++ | Very good Contrast (>500) |
| | + | Good Contrast (<500) |
| | 0 | No Contrast |

Concentration of 20 wt % in cyclopentanone (CP)

Irgacure ® 651 (3.00%) from CIBA Specialty Chemicals Inc.

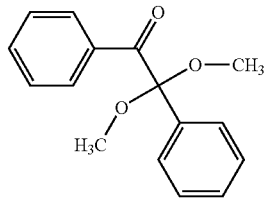 [SMILES: COC(OC)(C(=O)c1ccccc1)c1ccccc1]

Tinuvin ® 123 (0.50%) from CIBA Specialty Chemicals Inc.

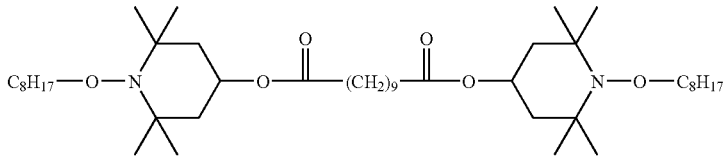

Hydrochinon-monomethylether (0.10%) from Aldrich
Thiol concentration is given in the table
Reactive mesogen structures (might be mixtures of LC) are given in the table

| LCP |
| --- |
| (Structure and weight ratio) |
| LCP (1) (91.40) |
| Blend |
| LCP (1) + LCP (2) |
| (63.35:27.15) |
| Blend |
| LCP (1) + LCP (3) |
| (55.7:35.7) |
| Blend |
| LCP (1) + LCP (3) |
| (55.5:35.5) |
| Blend |
| LCP (1) + LCP (3) |
| (22.8:69.28) |
| Blend |
| LCP (1) + LCP (3) |
| (45.6:46.185) |
| Blend |
| LCP (1) + LCP (3) |
| (45.6:46.185) |
| Blend |
| LCP (1) + LCP (2) |
| (45.6:45.26) |
| LCP (2) (90.52) |
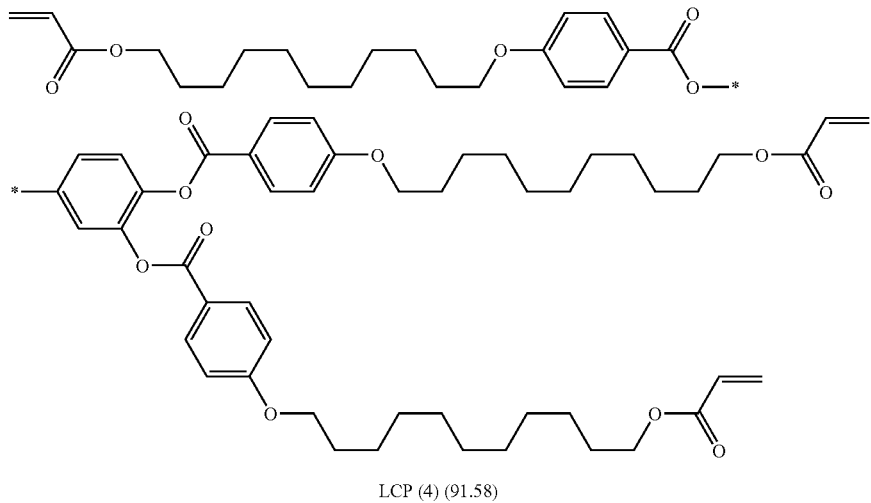
LCP (4) (91.58)
may be prepared according to methods well known to the skilled person. Preferably, LCP (4) may be prepared in analogy to the methods described in US 5593617

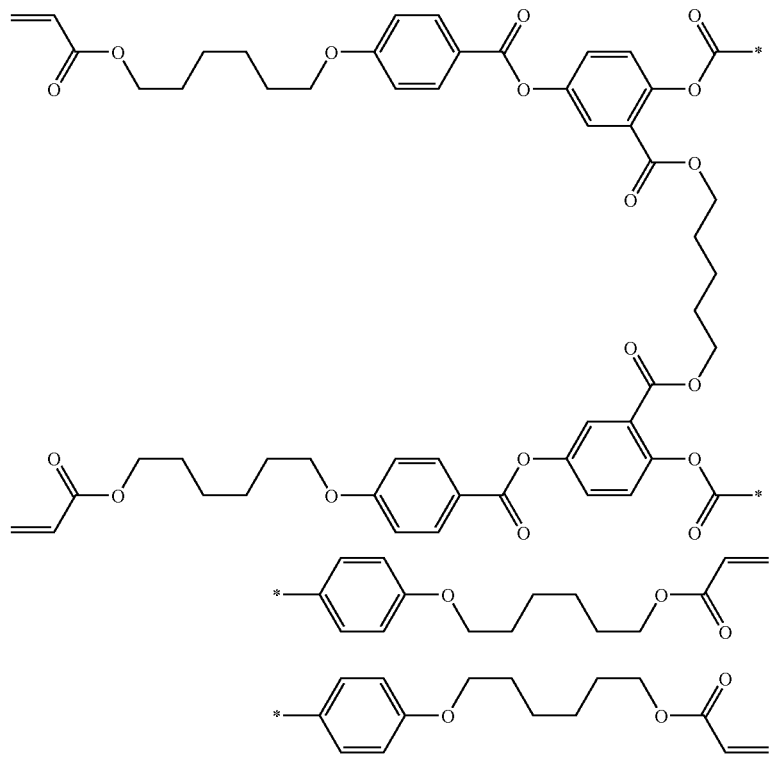
LCP (5) (91.35)
may be prepared according to methods well known to the skilled person. Preferably, LCP (5) may be prepared in analogy to the methods described in US 5567349 or WO 00/07675

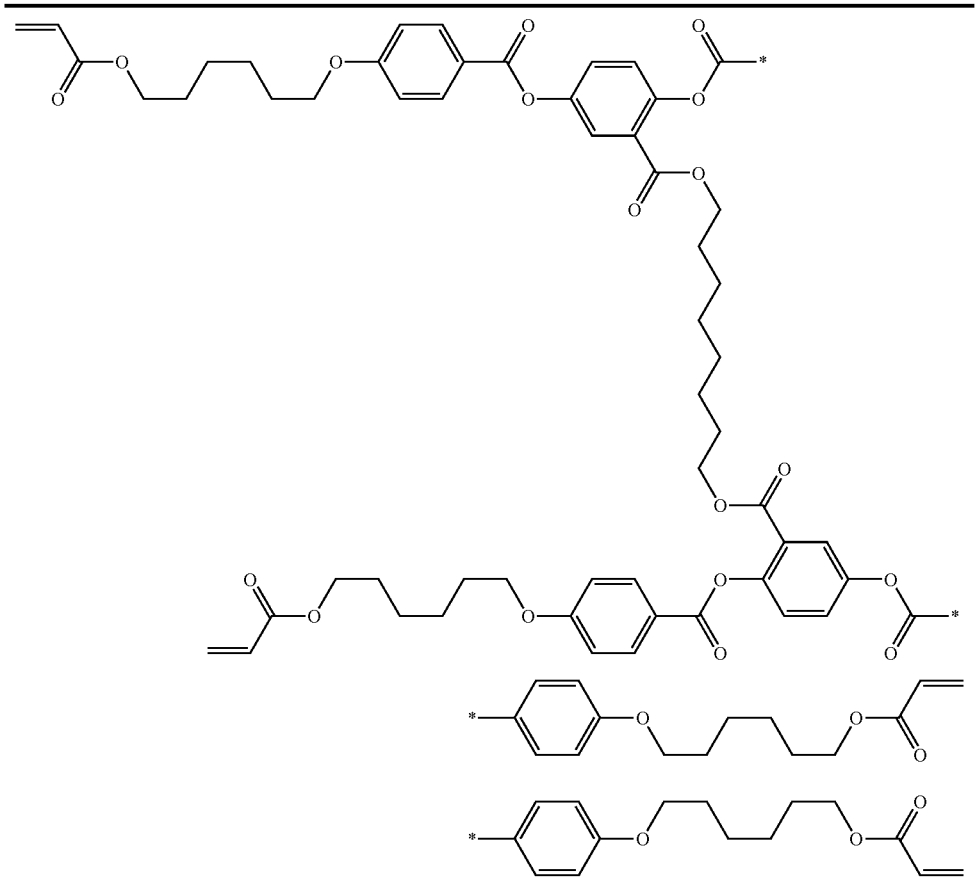
LCP (6) (91.48)
may be prepared according to methods
well known to the skilled person.
Preferably, LCP (6) may be prepared in
analogy to the methods described in
US 5567349 or WO 00/07675
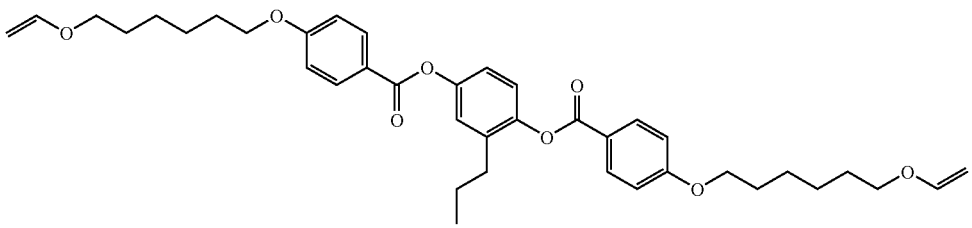
LCP (14) (89.61)
may be prepared according to methods
well known to the skilled person.
Preferably, LCP (14) may be prepared in
analogy to the methods described in
EP 331233 or
WO 95/24454
LCP (1):LCP (5)
(54.84:36.56)
LCP (1):LCP (6)
(45.70:47.74)
LCP (1):LCP (3):LCP (4)
(41.82:26.75:22.88)

-continued

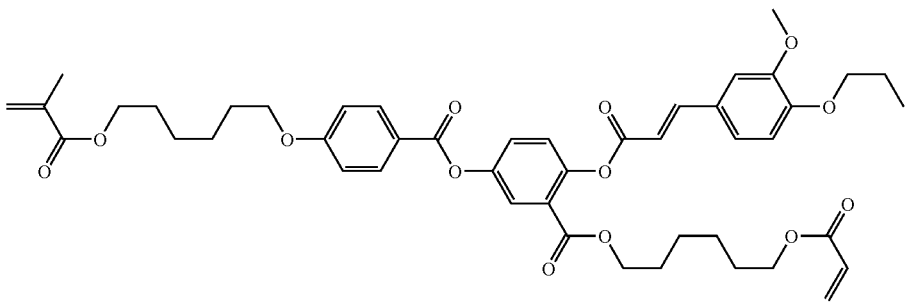

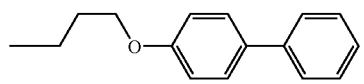

LCP (16) (92.72)

may be prepared according to methods well known to the skilled person. Preferably, LCP (6) may be prepared in analogy to the methods described in WO 00/055110

| $T_c$ ($T_{AN}$) (° C.) | A | Al.p. | P | Comment |
|---|---|---|---|---|
| 44 (39) | ✓ | ++ | 5.0 | Irgacure ® 369 was used |
| 56 (53) | ✓ | ++ | 5.0 | Solvent used: MIBK1 + CP1 Tego ® Wet KL 245 (0.5%) was added to the LCP formulation |
| 56 (53) | ✓ | ++ | 5.0 | Solvent used: MIBK8 + cyclohexanone |
| 56 (53) | ✓ | ++ | 5.0 | Solvent used: MIBK8 + cyclohexanone Tego ® Wet 500 (0.4%) was added to the LCP formulation |
| 79 (70) | ✓ | ++ | 3.92 | Solvent used: cyclohexanone Irgacure ® 819 was used Tego ® Wet 500 (0.4%) was added to the LCP formulation |
| 68 (63) | ✓ | ++ | 4.215 | Solvent used: cyclohexanone Irgacure ® 819 was used Tego ® Wet 500 (0.4%) was added to the LCP formulation |
| 65 (60) | ✓ | ++ | 4.215 | Solvent used: cyclohexanone Tego ® Wet 500 (0.4%) was added to the LCP formulation |
| 65 (60) | ✓ | ++ | 5.14 | Solvent used: cyclohexanone Tego ® Wet KL 245 (0.4%) was added to the LCP formulation |
| 90 (83) | ✓ | ++ | 5.48 | Solvent used: cyclohexanone Tego ® Wet KL 245 (0.4%) was added to the LCP formulation |
| 41 (38) | ✓ | ++ | 4.82 | |

-continued

| | | | | | |
|---|---|---|---|---|---|
| 63 (59) | ✓ | ++ | 5.05 | LCP cured at 1 J/cm$^2$ | |
| 83 (71) | ✓ | ++ | 4.92 | LCP cured at 1 J/cm$^2$ | |
| 71 (30) | ✓ | + | 6.79 | LCP cured at 2 J/cm$^2$ | |
| 56 (50) | ✓ | + | 5.0 | Irgacure ® 651-1.20% | |
| | | | | Irgacure ® 369-1.80% | |
| 65 (59) | ✓ | ++ | 4.96 | Irgacure ® 651-1.5% | |
| | | | | Irgacure ® 369-1.5% | |
| 54 (49) | ✓ | ++ | 4.95 | | |
| 72 (64) | ✓ | + | 3.68 | LCP cured at 1 J/cm$^2$ | |

Example 9

The prior-art approach described by Philips (Journal of SID Dec. 3, 2004) was investigated in comparison to the approach according to the invention. To reproduce the prior-art results a standard acrylate polymerisable LC mixture is used (constituents in Table A) and the patterned polymerization is carried out in nitrogen atmosphere. To prevent area-wide polymerization, very small exposure energies have to be used according to the description of the prior art.

Figure 2:
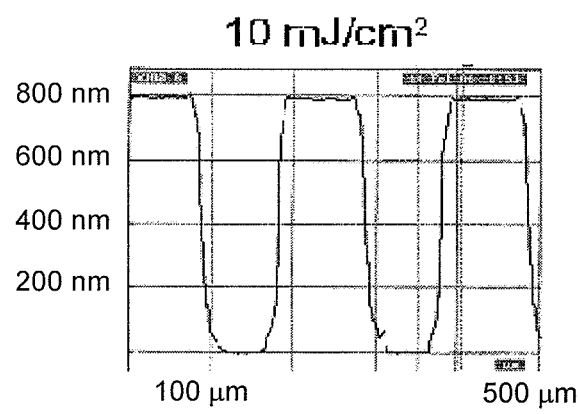
Figure 3:
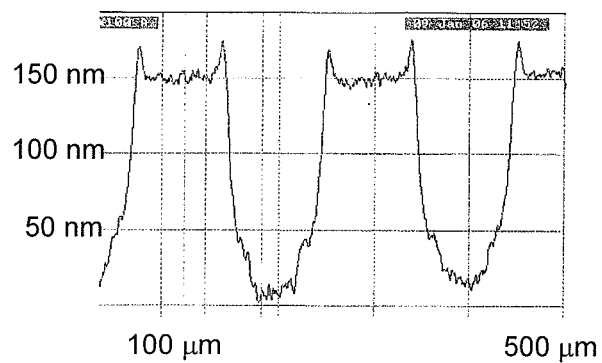

Four samples were prepared according to the process conditions listed in Table B. Washed D263 glass plates were used as substrates. By means of spin-coating a solution of ROP-103 (photo-alignment material of ROLIC Technologies) with a solid content of 2 weight percent in cyclopentanone an alignment layer with a dry thickness of approximately 60 nm was prepared. The alignment layer was subsequently thermally treated on a hot-plate for 10 minutes at a temperature of 180° C. After that, the photo-alignment layer was vertically exposed to linearly polymerized UVB light (wavelengths between 280 and 320 nm). A dose of 150 mJ/cm$^2$ was applied at an intensity of 3 mW/cm$^2$. In a next step, the standard acrylate-based polymerizable liquid crystalline formulation according to Table A(a) was spin-coated on top of the functionalized photo-alignment layer. For this a 25 weight percent solution in anisole was used. A dry film thickness of approximately 800 nm was achieved this way. A thermal treatment at a temperature of 40° C. on a hot-plate was then carried out for a duration of 10 minutes. After that, a patterned radiation curing was done. For this, the film was exposed to collimated light through a black and white mask with a 100 micron stripe pattern. The mask was kept at a distance of approximately 15 micron from the surface of the liquid crystalline layer. Samples were polymerized by exposure through the mask with UV doses of 1, 5, 10 and 500 mJ/cm$^2$. After that, a development process was conducted, i.e. the samples were dipped in ethyl-acetate for 10 seconds to remove the unpolymerized material. FIG. 1 shows the measured thickness profile (Alpha-stepper 500, KLA-Tencor Corporation) of the sample polymerized in nitrogen with 1 mJ/cm$^2$, FIG. 2 shows profile of the sample polymerized in nitrogen with 10 mJ/cm$^2$ and FIG. 3 shows profile of the sample polymerized in nitrogen with 500 mJ/cm$^2$.

The patterning in principle also works according to the prior art approach. Two basical drawbacks are, however, obvious:
(1) the lateral resolution is degraded if the polymerization dose is increased (1 mJ/cm$^2$: 7 micron extension of the transition region between the zones with and without LCP; 5 mJ/cm$^2$: 30 micron transition region; 10 mJ/cm$^2$: 45 micron transition region), for 500 mJ/cm$^2$ the degree of polymerization of the material in the unexposed zones is too high to allow a full removal of the material during the development process and
(2) the solubility contrast is rather low, i.e. considerable part of the polymerized material is unintentionally dissolved if the polymerization dose is reduced (1 mJ/cm$^2$: remaining thickness 600 nm; 10 mJ/cm$^2$: remaining thickness: 800 nm).

Thus, this process only allows to adjust a compromise between the solubility contrast and the lateral resolution of the pattern.

Figure 4:
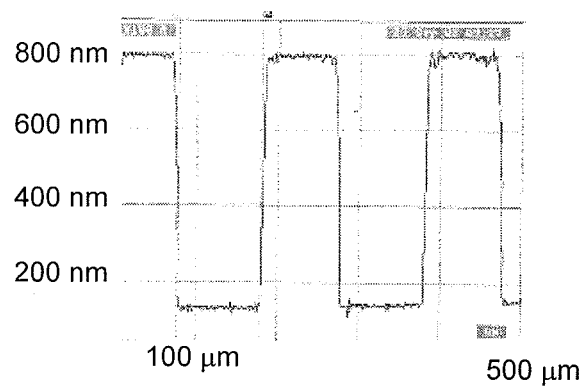

An additional sample was prepared according to the invention. The same process as previously described was applied. However, instead of the standard acrylate formulation a liquid crystalline formulation containing a thiol unit was used. The constituents of the mixture are indicated in Table A (b). For the patterned exposure a UV dose of 500 mJ/cm$^2$ was used. In this case the development process only leads to a very small loss of material in the exposed areas of the sample (<5%) and in the unexposed zones the material is fully removed during the development process, i.e. the solubility contrast is very high. Furthermore, the lateral resolution is very high (5 micron extension of the transition region) and exhibits a much lower dependence on the actual processing conditions. The thickness profile of the sample is shown in FIG. 4. The process parameters are indicated in Table C.

TABLE A

Components of polymerizable liquid crystal mixtures.

| Component: | Concentration by weight: |
|---|---|
| (a) Standard acrylate mixture: | |
| Compound (I) according to example 1 | 96.4% |
| Irgacure ® 369, 2-benzyl-2-dimethylamino-1 (4-morpholinophenyl)-butanone-1, from CIBA Specialty Chemicals Inc. | 3% |
| Tinuvin ® 123, bis(1-octyloxy-2,2,6-tetramethyl-4-piperidyl) sebacate, from CIBA Specialty Chemicals Inc. | 0.5% |
| Hydrochinon-monomethylether, from Aldrich | 0.1% |
| (b) Acrylate/thiol mixture: | |
| Compound (I) according to example 1 | 91.4% |
| Pentaerythritol tetrakis (3-mercaptopropionate), from Aldrich | 5% |
| Irgacure ® 369, 2-benzyl-2-dimethylamino-1 (4-morpholinophenyl)-butanone-1, from CIBA Specialty Chemicals Inc. | 3% |
| Tinuvin ® 123, bis(1-octyloxy-2,2,6-tetramethyl-4-piperidyl) sebacate, from CIBA Specialty Chemicals Inc. | 0.5% |
| Hydrochinon-monomethylether, from Aldrich | 0.1% |

TABLE B

Process parameters for standard acrylate mixture.

| | |
|---|---|
| Substrate: | washed D263 glass (Schott AG) |
| Alignment layer: | |
| Material: | ROP-103 (photo-alignment material from ROLIC Technologies), |
| Solution: | 2% in cyclopentanone |
| Spin coating: | 2000 rpm for 60 seconds |
| Thermal treatment: | 180° C. for 10 minutes on hot-plate |
| LPUV exposure: | 150 mJ/cm$^2$ (UVB) at 3 mW/cm$^2$ |
| Polymerizable liquid crystal material: | |
| Material: | standard acrylate mixture (Table A (a)), $T_c \approx 55°$ C. |
| Solution: | 25% in anisole |
| Spin coating: | 800 rpm for 60 seconds |
| Thermal treatment: | 40° C. for 10 minutes on hot-plate |
| Patterned radiation curing: | 1, 5, 10 and 500 mJ/cm$^2$ (UVA and UVB) at 8 mW/cm$^2$, collimated light |
| (a) Development process: | Dipping of sample in ethyl-acetate bath for approx. 10 seconds |
| (b) Second radiation curing at elevated temperature: | 500 mJ/cm$^2$ (UVA and UVB) at 50 mW/cm$^2$, uncollimated light second radiation curing exposure without mask, in air Temperature: ≈60° C. applied by means of hot-plate |

TABLE C

Process parameters for acrylate/thiol mixture.

| | |
|---|---|
| Substrate: | |
| Alignment layer: | same as Table B |
| Polymerizable liquid crystal material: | |
| Material: | acrylate/thiol mixture (Table A (b)), $T_c \approx 44°$ C. |
| Solution: | 25% in anisole |
| Spin coating: | 800 rpm for 60 seconds |
| Thermal treatment: | 40° C. for 10 minutes on hot-plate |
| Patterned radiation curing: | 500 mJ/cm$^2$ (UVA and UVB) at 8 mW/cm$^2$, collimated light, in air atmosphere |
| (a) Development process: | Same as Table B |
| (b) Second radiation curing at elevated temperature: | Same as Table B |

Example 10

Process according to example 9 with the proviso that instead of carrying out a development process a second polymerization was applied at a temperature above the clearing point of the unexposed LCP zones (parameters are indicated in Table B).

With the standard acrylate material, the restriction to low exposure doses leads to the problem that only a very small difference in the degree of polymerization (and thus in the clearing points) between the exposed and the unexposed zones can be achieved. Therefore, it becomes very difficult to control the temperature with sufficient accuracy over the area of the sample such that the unexposed zones are just above the clearing point and the partially polymerized zones are still below the clearing point.

If the first, i.e. the patterned exposure of the standard acrylate LCP film is done with a dose of 10 mJ/cm$^2$, the resolution is already considerably diminished compared to the case of using lower doses. But on the other hand the contrast in the clearing point between exposed and unexposed zones is already comparatively large. Nevertheless, an imperfect contrast between unexposed and exposed stripes is found. In case the second polymerization is done at a temperature of 50° C., a residual birefringence is found in the unexposed stripes which are supposed to be isotropic. This disadvantage becomes even more pronounced if lower exposure doses like 5 or 1 mJ/cm$^2$ are applied with the target to improve the lateral resolution.

For the thiol containing polymerizable liquid crystalline mixture a very high contrast in the clearing point between exposed and unexposed zones can be achieved. A second UV exposure at an elevated temperature thus easily provides for zones with birefringence (the zones exposed during the first, patterned polymerization) and zones without any residual birefringence (the zones not exposed during the first, patterned polymerization).

It thus turns out that because of the very limited process windows for exposure doses and temperatures with standard acrylate LCP, the retardation patterning process is considerably easier and leads to significantly better resolution with air-curable LCP materials including a component with a thiol or thio-ether unit. Only compromises between solubility contrast (development process) or retardation contrast (process with second polymerization above clearing point) and the resolution of the pattern can be adjusted. The major advantage of air-curable LCP mixtures regarding patterning is the possibility to adjust a well-defined transition between polymerized and non-polymerized zones in an LCP film using exposure doses leading to reasonable degree of polymerization.

Example 11

Process of Patterning a Polymerizable Liquid Crystalline Formulation Containing a Thiol Component on a Plastic Substrate, Namely Tri-Acetate Cellulose (TAC)

The processing conditions are listed in Table D.

The thickness profile measured after the development confirms that the patterning process worked in a preferred way.

TABLE D

Processing conditions: patterning on plastic substrate TAC

| | |
|---|---|
| Substrate: | TAC (tri acetate cellulose) with solvent barrier layer |
| Alignment layer: | |
| Material: | ROP-103 (photo-alignment material from ROLIC Technologies), |
| Solution, spin coating: | 2% in MEK, 2000 rpm for 60 seconds |
| Thermal treatment: | 60° C. for 10 minutes on hot-plate |
| LPUV exposure: | 150 mJ/cm$^2$ (UVB) at 3 mW/cm$^2$ |
| Polymerizable liquid crystal material: | |
| Material: | acrylate/thiol mixture (Table A (b)), $T_c \approx 44°$ C. |
| Solution: | 25% in anisole |
| Spin coating: | 800 rpm for 60 seconds |
| Thermal treatment: | 40° C. for 10 minutes on hot-plate |
| Patterned radiation curing: | 500 mJ/cm$^2$ (UVA and UVB) at 8 mW/cm$^2$, collimated light in air atmosphere |
| (a) Development process: | Rinsing of sample with ethyl-acetate for approx. 10 seconds |

Example 12

Patterning a Polymerizable Liquid Crystalline Formulation Containing a Thiol Component on a Silicon Wafer as a Substrate The processing conditions are listed in Table E.

The thickness profile measured after the development confirms that the patterning process worked in a preferred way.

TABLE E

Processing conditions: patterning on silicon wafer.

| | |
|---|---|
| Substrate: | Si wafer |
| Alignment layer: | |
| Material: | ROP-103 (photo-alignment material from ROLIC Technologies), |
| Solution, spin coating: | 2% in cyclopentanone, 2000 rpm for 60 seconds |
| Thermal treatment: | 180° C. for 10 minutes |
| LPUV exposure: | 150 mJ/cm$^2$ (UVB) at 3 mW/cm$^2$ |
| Polymerizable liquid crystal material: | |
| Material: | acrylate/thiol mixture (Table A (b)), $T_c \approx 44°$ C. |
| Solution: | 25% in anisole |
| Spin coating: | 800 rpm for 60 seconds |
| Thermal treatment: | 40° C. for 10 minutes on hot-plate |
| Patterned radiation curing: | 500 mJ/cm$^2$ (UVA and UVB) at 8 mW/cm$^2$, collimated light in air atmosphere |
| (a) Development process: | Rinsing of sample with ethyl-acetate for approx. 10 seconds |

Example 13

Patterning by Using a Rubbed Polyimide Layer to Align the Polymerizable Liquid Crystalline Formulation Containing a Thiol Component First, the polymerizable liquid crystalline formulation is aligned and subsequently the patterning process was carried out. The processing conditions are listed in Table F. A perfect alignment could be achieved this way. The thickness profile measured after the development confirms that the patterning process worked in a preferred way.

TABLE F

Processing conditions: patterning on glass with rubbed polyimide as alignment layer.

| | |
|---|---|
| Substrate: | washed D263 glass |
| Alignment layer: | |
| Material: | Nissan SE-150 |
| Spin coating: | 2000 rpm for 60 seconds |
| Thermal treatment: | 80° C. for 15 minutes, 250° C. for 50 minutes |
| Rubbing treatment | |
| Polymerizable liquid crystal material: | |
| Material: | acrylate/thiol mixture (Table A (b)), $T_c \approx 44°$ C. |
| Solution: | 25% in anisole |
| Spin coating: | 800 rpm for 60 seconds |
| Thermal treatment: | 40° C. for 10 minutes on hot-plate |
| Patterned radiation curing: | 500 mJ/cm$^2$ (UVA and UVB) at 8 mW/cm$^2$, collimated light in air atmosphere |

TABLE F-continued

Processing conditions: patterning on glass with rubbed polyimide as alignment layer.

| | |
|---|---|
| (a) Development process: | Dipping of sample in ethyl-acetate bath for approx. 10 seconds |

Example 14

Patterning by Using a Rubbed TAC Substrate to Align the Polymerizable Liquid Crystalline Formulation Containing a Thiol Component which was Directly Coated onto the TAC Substrate First, the polymerizable liquid crystalline formulation was aligned and subsequently the patterning process was carried out. The processing conditions are listed in Table G.

A perfect alignment could be achieved this way. The thickness profile measured after the development confirms that the patterning process worked in a preferred way.

TABLE G

Processing conditions: patterning on rubbed TAC substrate

| | |
|---|---|
| Substrate: | TAC (tri acetate cellulose) |
| Alignment layer: | |
| Material: | no additional layer |
| Rubbing treatment | |
| Polymerizable liquid crystal material: | |
| Material: | acrylate/thiol mixture (Table A (b)), $T_c \approx 44°$ C. |
| Solution: | 25% in anisole |
| Spin coating: | 800 rpm for 60 seconds |
| Thermal treatment: | 40° C. for 10 minutes on hot-plate |
| Patterned radiation curing: | 500 mJ/cm$^2$ (UVA and UVB) at 8 mW/cm$^2$, collimated light in air atmosphere |
| (a) Development process: | Dipping of sample in ethyl-acetate bath for approx. 10 seconds |

Example 15

Method of Pattern of Two or Three Different Retardance Values (Either Isotropic or Certain Δnd)

Applying the binary retardation patterning method according to example 15 in a stack of two polymerized liquid crystal layers (one homogeneous and one patterned) two different retardation values can be adjusted (retardation of first layer and retardation of first layer plus retardation of second layer). In this case no additional photo-alignment layer is required because the additional LCP can be directly aligned by the subjacent homogeneously oriented LCP layer.

An additional photo-alignment layer for the second liquid crystal polymer layer, however, brings along an additional degree of freedom which e.g. allows to adjust three different values of retardation if the photo-alignment layer is LPUV exposed in a patterned way to selectively transfer 0° and 90° orientation of the optical axis to the liquid crystal molecules on top. The three different retardation values are given by: retardation of first LCP, retardation of first LCP plus retardation of second layer, retardation of first LCP minus retardation of second layer. This process represents a combination of digital retardation patterning and patterning of the azimuthal orientation in a two LCP layer approach.

Figure 5:
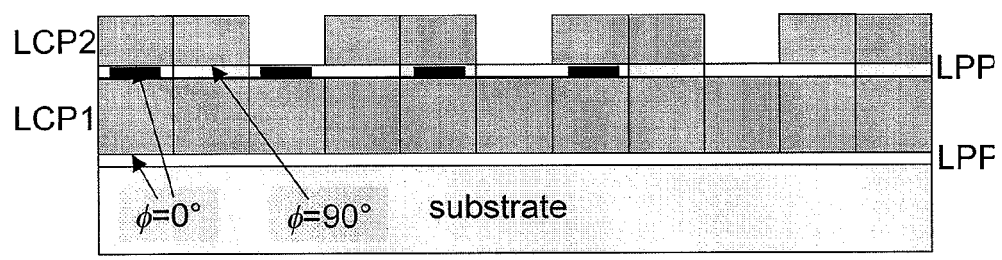

The digital retardation patterning combined with azimuthal orientation patterning of a second LCP layer is illustrated in FIG. 5. In contrast to the depiction in FIG. 5, it is also possible to pattern the azimuthal orientation of the first LCP layer by patterned photo-alignment of the LPP1 and then pattern the retardation of the homogeneously aligned second LCP layer. By this way, it is also possible to adjust three different retardation values. In addition, the first LCP layer can have variable azimuthal orientations with the same optical retardation level. If the values for the patterned azimuthal orientation are not restricted to 0° and 90°, more than only three or four different local birefringent properties can be adjusted. The degrees of freedom are further increased by allowing a patterned photo-orientation of both LCP layers and an additional retardation patterning of the second layer. In case the film is not developed (i.e. partially removed) or if the film is developed, but subsequently covered with a planarization layer a patterning of the retardation for both LCP layers is also conceivable.

Samples were prepared using both the development in ethyl acetate approach and the method of polymerization above the clearing point of the unexposed zones according to the processing descriptions in Tables 8 and 9.

TABLE H

Processing conditions: retardation patterning with two LCP layers: alignment of second LCP layer perpendicularly to first layer

| | |
|---|---|
| Substrate: | washed D263 glass |
| Alignment layer: First layer | |
| Material: | ROP103 (photo-alignment material from ROLIC) |
| Solution, spin-coating: | 2% in cyclopentanone, 2000 rpm for 60 seconds |
| Thermal treatment: | 180° C. for 10 minutes |
| LPUV exposure: | 150 mJ/cm$^2$ (UVB) at 3 mW/cm$^2$ |
| Polymerizable liquid crystal material: First layer | |
| Material: | standard acrylate mixture (Table A (a)), $T_c \approx 55°$ C. |
| Solution, spin-coating: | 40% in anisole, 1000 rpm for 60 seconds |
| Thermal treatment: | 40° C. for 10 minutes on hot-plate |
| Radiation curing: | 5 J/cm$^2$ (UVA and UVB) at 50 mW/cm$^2$, uncollimated light without mask, in nitrogen atmosphere |
| Alignment layer: Second layer | |
| Material: | ROP103 (photo-alignment material from ROLIC) |
| Solution, spin-coating: | 2% in cyclopentanone, 2000 rpm for 60 seconds |
| Thermal treatment: | 180° C. for 10 minutes |
| LPUV exposure: | 150 mJ/cm$^2$ (UVB) at 3 mW/cm$^2$, aligned perpendicularly to first alignment layer |
| Polymerizable liquid crystal material: Second layer | |
| Material: | acrylate/thiol mixture (Table A (b)), $T_c \approx 44°$ C. |
| Solution, spin-coating: | 25% in anisole, 800 rpm for 60 seconds |
| Thermal treatment: | 40° C. for 10 minutes on hot-plate |
| Patterned radiation curing: | 1 J/cm$^2$ (UVA and UVB) at 8 mW/cm$^2$, collimated light, in air atmosphere |
| (a) Development process: | Dipping of sample in ethyl-acetate bath for approx. 10 seconds |
| (b) Second radiation curing at elevated temperature: | |
| Radiation curing: | 500 mJ/cm$^2$ (UVA and UVB) at 50 mW/cm$^2$, uncollimated light second radiation curing exposure without mask, in air |
| Temperature: | ≈60° C. applied by means of hot-plate |

In one case, a second photo-alignment layer was used which was prepared to induce perpendicular optical axes of the first and second liquid crystal polymer layer (Table H). In this case, observation of the samples between crossed polarizers showed darker zones corresponding to the retardation given by the difference between retardation levels of the two LCP films and brighter zones corresponding to the retardation of only the homogeneous, i.e. un-patterned liquid crystal polymer film.

In the second case no additional photo-alignment layer was used in between the two liquid crystal polymer films (Table I). Thus, the second, patterned liquid crystal polymer film is aligned parallel to the first one. Observation between crossed polarizers showed that zones with higher retardation corresponding to the sum of the two retardations of the two liquid crystal polymer films and zones with lower retardation corresponding to the retardation of only the subjacent un-patterned liquid crystal polymer film were generated.

If the alignment direction for the second layer is additionally defined by means of a patterned LPUV exposure of a photo-alignment layer (0° or 90°, a film with an arbitrary pattern of three different optical retardations can be realized.

TABLE I

Processing conditions: retardation patterning with two LCP layers: alignment of second LCP layer perpendicularly to first layer.

| | |
|---|---|
| Substrate: | washed D263 glass |
| Alignment layer: | |
| Material: | ROP103 (photo-alignment material from ROLIC) |
| Solution, spin-coating: | 2% in cyclopentanone, 2000 rpm for 60 seconds |
| Thermal treatment: | 180° C. for 10 minutes |
| LPUV exposure: | 150 mJ/cm$^2$ (UVB) at 3 mW/cm$^2$ |
| Polymerizable liquid crystal material: First layer | |
| Material: | standard acrylate mixture (Table A (a)), $T_c \approx 55°$ C. |
| Solution: | 40% in anisole |
| Spin coating: | 1000 rpm for 60 seconds |
| Thermal treatment: | 40° C. for 10 minutes on hot-plate |
| Radiation curing: | 5 J/cm$^2$ (UVA and UVB) at 50 mW/cm$^2$, uncollimated light without mask, in nitrogen atmosphere |
| Polymerizable liquid crystal material: Second layer | |
| Material: | acrylate/thiol mixture (Table A (b)), $T_c \approx 44°$ C. |
| Solution: | 30% in anisole |
| Spin coating: | 1000 rpm for 60 seconds |
| Thermal treatment: | 40° C. for 10 minutes on hot-plate |
| Patterned radiation curing: | 1 J/cm$^2$ (UVA and UVB) at 8 mW/cm$^2$, collimated light, in air atmosphere |

TABLE I-continued

Processing conditions: retardation patterning with two LCP layers: alignment of second LCP layer perpendicularly to first layer.

| | |
|---|---|
| (a) Development process: | Dipping of sample in ethyl-acetate bath for approx. 10 seconds |
| (b) Second radiation curing at elevated temperature: | 500 mJ/cm² (UVA and UVB) at 50 mW/cm², uncollimated light second radiation curing exposure without mask, in air Temperature: ≈60° C. applied by means of hot-plate |

Example 16

Retardation patterning with gray mask radiation curing

A simple process which allows a patterning of the retardation to two or more different retardation values would be very useful for various applications. Several methods of such patterning with variable retardation values are realizable with the above mentioned advantages of the acrylate/thiol patterning approach.

One possibility consists of using a gray level mask which transmits a local pattern of radiation intensities to the liquid crystal monomer film to be polymerized. The thus generated intensity pattern leads to a pattern of the degree of polymerization over the sample area. A first method to transfer the pattern of the polymerization degree into a pattern of the optical retardation is to carry out a second radiation curing at an elevated temperature. Depending on the degree of polymerization, the optical retardation within each partition of the film will drop by a certain amount. Strongly polymerized zones will show only a small drop, weakly polymerized zones will experience a considerable drop or a complete loss of the optical retardation. To allow the adjustment of the desired optical retardation values, this method requires a precise control of the temperature as well as the possibility to accurately adjust the temperature over the sample area.

A further possibility is to develop a film which was polymerized by means of a gray level mask is to dip the film in a suitable solvent. In this case LCP material will be removed according to the local degree of polymerization and thus a pattern of the optical retardation will develop.

Figure 6:
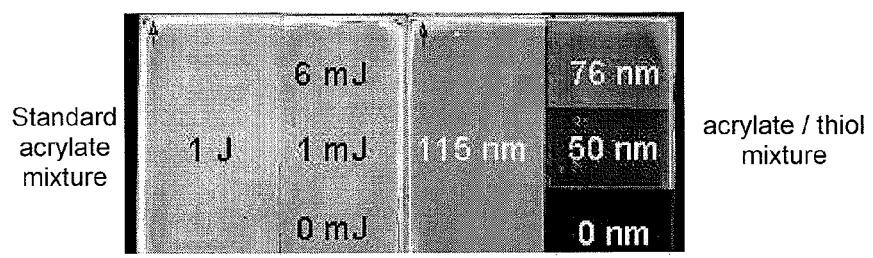

This example comprises the second approach. The applied process parameters are listed in Tables J and K. Each sample consists of four zones which were polymerized with different exposure doses as indicated in Table J. The patterning process does not work in case the polymerization is done in nitrogen atmosphere. With an acrylate/thiol material, however, the patterning process works very well. Four different retardation levels could be adjusted. The samples including the values of the exposure doses and the values of the optical retardations for the acrylate/thiol mixture are shown in FIG. 6. The result shows that the retardation can be patterned in a very broad interval by this method. Depending on the application, after the development process a post-polymerization process might be necessary to increase the overall degree of polymerization.

TABLE J

Processing conditions: retardation patterning with gray mask radiation curing: standard acrylate liquid crystal polymer material

| | |
|---|---|
| Substrate: | washed D263 glass |
| Alignment layer: First layer | |
| Material: | ROP103 (photo-alignment material from ROLIC) |
| Solution, spin-coating: | 2% in cyclopentanone, 2000 rpm for 60 seconds |
| Thermal treatment: | 180° C. for 10 minutes |
| LPUV exposure: | 150 mJ/cm² (UVB) at 3 mW/cm² |
| Polymerizable liquid crystal material: Second layer | |
| Material: | standard acrylate mixture (Table A (a)), $T_c \approx 55°$ C. |
| Solution: | 25% in anisole |
| Spin coating: | 800 rpm for 60 seconds |
| Thermal treatment: | 40° C. for 10 minutes on hot-plate |
| Patterned radiation curing: | 1 J/cm², 6, 1 and 0 mJ/cm² (UVA and UVB) at 8 mW/cm², collimated light, in air |
| (a) Development process: | Dipping of sample in ethyl-acetate bath for approx. 10 seconds |

TABLE K

Processing conditions: retardation patterning with gray mask radiation curing: acrylate/thiol mixture Same processing conditions as given in Table J, with the proviso that the acrylate/thiol mixture (Table A(b)) was used and for patterned radiation curing instead of nitrogen atmosphere air atmosphere is used

The invention claimed is:

1. Photo-polymerized, patterned or unpatterned liquid crystal polymer comprising thio-ether units of formula (I)

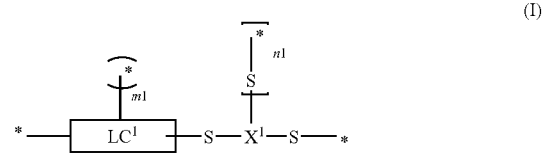

(I)

* covalent bond, which links the unit of formula (I) to the residue of the polymer wherein $LC^1$ is selected from the group of liquid crystal residues, representing the polymerized form of a liquid crystal, which has in its un-polymerized form at least two polymerizable unsaturated carbon-carbon bonds, or carbon-nitrogen-bonds, and comprising one or more rod-shaped, board-shaped or disk-shaped mesogenic groups, $X^1$ is selected from the group of aliphatic organic residues, which are straight-chain or branched, saturated and unsaturated hydrogencarbons, wherein at least one carbon, hydrogen and/or hydrogencarbon may be replaced by a heteroatom, which is N, S, O, OOC, COO, OCO, OCOO, OOCO or CO, and $n^1$ is an integer ≥0 and $m^1$ is an integer ≥0;

with the proviso that if $n^1$ is 0, then $m^1$ is >0, and if $m^1$ is 0, then $n^1$>0; and which is prepared in an atmosphere containing oxygen, with the proviso that polymer dispersed liquid crystals are excluded for $LC^1$.

2. Method for the preparation of patterned and unpatterned optical or electro-optical components, systems or devices comprising preparing patterned and unpatterned optical or electro-optical components, systems or devices from a liquid crystal polymer as claimed in claim 1.

3. Composition (XX) comprising
a) at least one polythiol of formula (IX)

$$X^a \!-\!\![SH]_{n^t} \quad (IX)$$

wherein
$X^a$ is an aliphatic organic residue,
$n^t$ is an integer $\geq 2$, and
b) at least one liquid crystal having at least two polymerizable functional groups, and
c) optionally at least one reactive and/or non-reactive additive(s), and
d) optionally at least one initiator(s), and
e) optionally at least one solvent(s).

4. Method for the preparation of patterned and unpatterned optical or electro-optical components, systems or devices comprising preparing patterned and unpatterned optical or electro-optical components, systems or devices from a composition (XX) as claimed in claim 3.

5. Process for the preparation of a liquid crystal polymer comprising thio-ether units of formula (I)

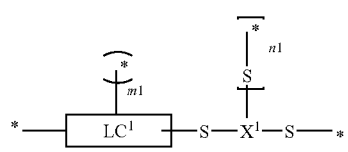

(I)

* covalent bond, which links the unit of formula (I) to the residue of the polymer
wherein
$LC^1$ is selected from the group of liquid crystal residues, representing the polymerized form of a liquid crystal, which has in its un-polymerized form at least two polymerizable unsaturated carbon-carbon bonds, or carbon-nitrogen-bonds, and comprising one or more rod-shaped, board-shaped or disk-shaped mesogenic groups,
$X^1$ is selected from the group of aliphatic organic residues, which are straight-chain or branched, saturated and unsaturated hydrogencarbons, wherein at least one carbon, hydrogen and/or hydrogencarbon may be replaced by a hetereoatom, which is N, S, O, OOC, COO, OCO, OCOO, OOCO or CO, and
$n^1$ is an integer $\geq 0$ and
$m^1$ is an integer $\geq 0$;
with the proviso that if $n^1$ is 0, then $m^1$ is >0, and if $m^1$ is 0, then $n^1$ >0; and
which is prepared in an atmosphere containing oxygen, with the proviso that polymer dispersed liquid crystals are excluded for $LC^1$, said process comprising:

a) applying a composition (XX) comprising:
i) at least one polythiol of formula (IX)

$$X^a \!-\!\![SH]_{n^t} \quad (IX)$$

wherein
$X^a$ is an aliphatic organic residue,
$n^t$ is an integer $\geq 2$, and
ii) at least one liquid crystal having at least two polymerizable functional groups, and
iii) optionally at least one reactive and/or non-reactive additive(s), and
iv) optionally at least one initiator(s), and
v) optionally at least one solvent(s), and then
b) optionally drying, and then
c) polymerizing the composition, obtained after step a) or step b) in an atmosphere containing oxygen.

6. Method for the preparation of patterned and unpatterned optical or electro-optical components, systems or devices comprising preparing patterned and unpatterned optical or electro-optical components, systems or devices from a liquid crystal polymer prepared by the process as claimed in claim 5.

7. Applied composition (XXI), which is obtained according to process steps a) and optionally b) as follows:
a) applying a composition (XX) as claimed in claim 3, and then
b) optionally drying.

8. Method for the preparation of a patterned liquid crystal polymer comprising patterning an applied composition (XXI) as claimed in claim 7 and polymerizing the applied composition (XXI) in an atmosphere containing oxygen.

9. Method as claimed in claim 8, comprising birefringence patterning and/or thickness patterning and/or patterning of the optical axis orientation, and/or patterning of the degree of polymerization.

10. Method according to claim 8, comprising photo-polymerizing.

11. Patterned liquid crystal polymer, which is obtained by the method as claimed in claim 8.

12. Method for the preparation of patterned and unpatterned optical or electro-optical components, systems or devices comprising preparing patterned and unpatterned optical or electro-optical components, systems or devices from a patterned liquid crystal polymer as claimed in claim 11.

13. Method for the preparation of patterned and unpatterned optical or electro-optical components, systems or devices comprising preparing patterned and unpatterned optical or electro-optical components, systems or devices from an applied composition (XXI) as claimed in claim 7.

14. Liquid crystal polymer, which is obtained according to the process as claimed in claim 5.

15. Method for the preparation of patterned and unpatterned optical or electro-optical components, systems or devices comprising preparing patterned and unpatterned optical or electro-optical components, systems or devices from a liquid crystal polymer as claimed in claim 14.

16. Unpatterned or patterned optical or electro-optical component, systems or devices comprising:
(A) a liquid crystal polymer comprising thio-ether units of formula (I):

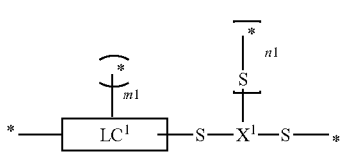

(I)

* covalent bond, which links the unit of formula (I) to the residue of the polymer
wherein
$LC^1$ is selected from the group of liquid crystal residues, representing the polymerized form of a liquid crystal, which has in its un-polymerized form at least two polymerizable unsaturated carbon-carbon bonds, or carbon-nitrogen-bonds, and comprising one or more rod-shaped, board-shaped or disk-shaped mesogenic groups,
$X^1$ is selected from the group of aliphatic organic residues, which are straight-chain or branched, saturated and unsaturated hydrogencarbons, wherein at least one carbon, hydrogen and/or hydrogencarbon may be replaced by an hetereoatom, which is N, S, O, OOC, COO, OCO, OCOO, OOCO or CO, and
$n^1$ is an integer $\geq 0$ and
$m^1$ is an integer $\geq 0$;
with the proviso that if $n^1$ is 0, then $m^1$ is >0, and if $m^1$ is 0, then $n^1$ >0; and
which is prepared in an atmosphere containing oxygen,
with the proviso that polymer dispersed liquid crystals are excluded for $LC^1$, or
(B) a liquid crystal polymer prepared by a process for the preparation of a liquid crystal polymer comprising thio-ether units of formula (I)

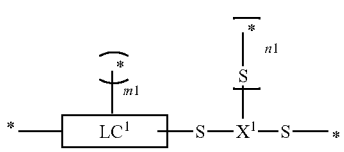

(I)

* covalent bond, which links the unit of formula (I) to the residue of the polymer
wherein
$LC^1$ is selected from the group of liquid crystal residues, representing the polymerized form of a liquid crystal, which has in its un-polymerized form at least two polymerizable unsaturated carbon-carbon bonds, or carbon-nitrogen-bonds, and comprising one or more rod-shaped, board-shaped or disk-shaped mesogenic groups, $X^1$ is selected from the group of aliphatic organic residues, which are straight-chain or branched, saturated and unsaturated hydrogencarbons, wherein at least one carbon, hydrogen and/or hydrogencarbon may be replaced by an hetereoatom, which is N, S, O, OOC, COO, OCO, OCOO, OOCO or CO, and
$n^1$ is an integer $\geq 0$ and
$m^1$ is an integer $\geq 0$;
with the proviso that if $n^1$ is 0, then $m^1$ is >0, and if $m^1$ is 0, then $n^1$>0; and
which is prepared in an atmosphere containing oxygen,
with the proviso that polymer dispersed liquid crystals are excluded for $LC^1$, said method comprising:
a) applying a composition (XX) comprising:
i) at least one polythiol of formula (IX)

$$X^a\text{---}[SH]_{n^t}$$ (IX)

wherein
$X^a$ is an aliphatic organic residue,
$n^t$ is an integer $\geq 2$, and
ii) at least one liquid crystal having at least two polymerizable functional groups, and
iii) optionally at least one reactive and/or non-reactive additive(s), and
iv) optionally at least one initiator(s), and
v) optionally at least one solvent(s), and then
b) optionally drying, and then
c) polymerizing the composition, obtained after step a) or step b) in an atmosphere containing oxygen, or
(C) a patterned liquid crystal polymer which is obtained by the method as claimed in claim 8.

17. Devices comprising an unpatterned or patterned optical or electro-optical component as claimed in claim 16.

18. Method of using an unpatterned or patterned optical or electro-optical component, comprising preparing a waveguide, a security or brand protection element, a bar code, an optical grating, a filter, a retarder, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non-linear optical properties, a decorative optical element, a brightness enhancement film, a component for wavelength-band-selective compensation, a component for multi-domain compensation, a component of multiview liquid crystal displays, an achromatic retarder, a polarization state correction / adjustment film, a component of optical or electro-optical sensors, a component of brightness enhancement film, a component for light-based telecommunication devices, a patterned G/H-polarizer with an anisotropic absorber, a patterned reflective circular polarizer, a patterned reflective linear polarizer, a patterned MC (monomer corrugated film) from an unpatterned or patterned optical or electro-optical component as claimed in claim 16.

* * * * *

UNITED STATES PATENT AND TRADEMARK OFFICE
CERTIFICATE OF CORRECTION

PATENT NO. : 8,574,454 B2  Page 1 of 1
APPLICATION NO. : 12/515918
DATED : November 5, 2013
INVENTOR(S) : Bachels et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 514 days.

Signed and Sealed this
Twenty-second Day of September, 2015

Michelle K. Lee
*Director of the United States Patent and Trademark Office*